US007004043B2

(12) United States Patent
Erel et al.

(10) Patent No.: US 7,004,043 B2
(45) Date of Patent: Feb. 28, 2006

(54) ELEVATED SUPPORT POLE WITH AUTOMATIC ELECTRICAL CONNECTION AND DISCONNECTION

(75) Inventors: Bulent Erel, Roswell, GA (US); Raymond V. Pagano, Stone Mountain, GA (US); James L. Pfaffenberger, II, Marietta, GA (US); Virgil L. Hunt, Jr., Covington, GA (US); Jen Chung-Hua, Decatur, GA (US)

(73) Assignee: Videolarm, Inc., Decatur, GA (US)

( * ) Notice: Subject to any disclaimer, the term of this patent is extended or adjusted under 35 U.S.C. 154(b) by 249 days.

(21) Appl. No.: 10/714,810

(22) Filed: Nov. 17, 2003

(65) Prior Publication Data

US 2004/0139812 A1 Jul. 22, 2004

Related U.S. Application Data

(63) Continuation-in-part of application No. 10/256,725, filed on Sep. 27, 2002, now Pat. No. 6,665,968, which is a continuation of application No. PCT/US01/10618, filed on Apr. 3, 2001, which is a continuation-in-part of application No. 09/566,350, filed on May 8, 2000, now Pat. No. 6,447,150.

(60) Provisional application No. 60/194,919, filed on Apr. 4, 2000.

(51) Int. Cl.
*F16H 3/06* (2006.01)
*F16M 11/04* (2006.01)
*H01R 13/62* (2006.01)

(52) U.S. Cl. ................. 74/89.23; 74/89.37; 248/125.2; 439/310; 439/362

(58) Field of Classification Search ................ 439/310, 439/362, 364, 374, 378; 362/153.1, 403; 248/125.1, 125.2, 295.11; 74/89.23, 89.33, 74/89.37

See application file for complete search history.

(56) References Cited

U.S. PATENT DOCUMENTS

| | | | |
|---|---|---|---|
| 2,738,492 | A | 3/1956 | Arneson et al. |
| 2,908,408 | A | 10/1959 | Reed |
| 3,610,584 | A | 10/1971 | Pfaff |
| 3,822,051 | A | 7/1974 | Karapita |

(Continued)

FOREIGN PATENT DOCUMENTS

| | | | |
|---|---|---|---|
| DE | 31 01 202 | A1 | 11/1982 |

(Continued)

*Primary Examiner*—Alan Cariaso
(74) *Attorney, Agent, or Firm*—Gardner Groff, P.C.

(57) ABSTRACT

A support pole for raising and lowering a supported object between a lower position and an elevated position is disclosed. The support pole includes an elongate pole and a carriage mounted for translational movement up and down the pole. Carriage locks at the top of the pole engage the carriage in the elevated position to prevent vibration of the supported object, and a stabilizer frame within the channel minimizes vibration during carriage transport. One or more electrical conductors are fixed in place, extending through at least a portion of the pole, terminating in an electrical contact for releasable engagement with a cooperating electrical contact mounted to the carriage as the carriage is raised into the elevated position.

29 Claims, 16 Drawing Sheets

U.S. PATENT DOCUMENTS

| | | | | | |
|---|---|---|---|---|---|
| 4,025,782 | A | | 5/1977 | Kaeser | |
| 4,051,525 | A | | 9/1977 | Kelly | |
| 4,149,230 | A | * | 4/1979 | Garchinsky | 362/403 |
| 4,162,708 | A | * | 7/1979 | Johnson | 172/4.5 |
| 4,173,268 | A | | 11/1979 | Nussbaum | |
| 4,198,022 | A | | 4/1980 | Pletcher et al. | |
| 4,537,083 | A | | 8/1985 | Saringer | |
| 4,593,883 | A | | 6/1986 | Nelson | |
| 4,618,886 | A | | 10/1986 | Mooney | |
| 4,656,569 | A | | 4/1987 | Buskell | |
| 4,658,212 | A | * | 4/1987 | Ozawa et al. | 439/310 |
| 4,717,353 | A | * | 1/1988 | Block | 439/310 |
| 4,878,160 | A | * | 10/1989 | Reneau et al. | 362/431 |
| 4,974,134 | A | | 11/1990 | Bourne | |
| D314,501 | S | | 2/1991 | Pagano | |
| 5,224,675 | A | | 7/1993 | Ellenberger et al. | |
| 5,255,882 | A | | 10/1993 | Schroppel | |
| 5,349,878 | A | | 9/1994 | White et al. | |
| 5,398,026 | A | | 3/1995 | Handsaker | |
| 5,406,327 | A | | 4/1995 | Guarnotta | |
| 5,429,519 | A | * | 7/1995 | Murakami et al. | 439/310 |
| 5,550,727 | A | | 8/1996 | Fenyvesy | |
| 5,647,758 | A | * | 7/1997 | Ichikawa et al. | 439/362 |
| 5,743,324 | A | * | 4/1998 | Kunstreich et al. | 439/310 |
| 5,887,841 | A | | 3/1999 | Newberg | |
| 5,975,726 | A | | 11/1999 | Latimer | |
| 6,081,240 | A | | 6/2000 | Hemmingsen, II | |
| 6,354,749 | B1 | | 3/2002 | Pfaffenberger, II | |
| 6,375,369 | B1 | | 4/2002 | Schneider et al. | |
| 6,447,150 | B1 | | 9/2002 | Jen et al. | |

FOREIGN PATENT DOCUMENTS

| | | | |
|---|---|---|---|
| FR | 2 752 805 | A1 | 3/1998 |
| FR | 2 752 805 | | 6/1998 |
| FR | 2 824 624 | A1 | 11/2002 |
| WO | WO 94/16267 | | 7/1994 |

* cited by examiner

Remote Control Panel

ELEVATED SUPPORT POLE WITH AUTOMATIC ELECTRICAL CONNECTION AND DISCONNECTION

CROSS-REFERENCE TO RELATED APPLICATIONS

This application is a continuation-in-part of U.S. patent application Ser. No. 10/256,725, filed Sep. 27, 2002, now U.S. Pat. No. 6,665,968 which in turn is a continuation of International Application No. PCT/US01/10618, designating the U.S. and having an international filing date of Apr. 3, 2001; which is a continuation-in-part to U.S. patent application Ser. No. 09/566,350, filed May 8, 2000, now U.S. Pat. No. 6,447,150; which in turn claimed the benefit of U.S. Provisional Patent Application Ser. No. 60/194,919, filed Apr. 4, 2000. All said applications are hereby incorporated by reference in their entireties herein.

BACKGROUND OF THE INVENTION

1. Field of the Invention

The present invention relates generally to elevated support structures, and more particularly to a support pole for raising and lowering an object between an elevated position and a lower position.

2. Description of Related Art

It is often desirable to support an object in an elevated position. For example, surveillance cameras, lights, signs, flags, banners, antennas and weather monitoring equipment are often supported a distance above the ground by mounting on a pole or mast. The added height can provide considerable advantage, including improved visibility, a better vantage point, improved signal reception, and avoidance of interference by lower structures and objects. However, maintenance, repair and installation of elevated equipment is often difficult and expensive, and may expose personnel to additional risk of injury due to the possibility of falls. Often, special equipment such as ladders, scaffolding or bucket trucks are required for access to elevated equipment.

Efforts have been made to facilitate service of elevated equipment at ground level by providing masts having equipment that can be raised and lowered. For example, U.S. Pat. No. 4,051,525 to Kelly, and U.S. Pat. No. 5,975,726 to Latimer disclose poles having cable lift mechanisms for raising and lowering equipment. Previously known poles facilitating the raising and lowering of equipment, however, have not proven fully satisfactory for a variety of reasons. For example, the lift mechanisms of such poles are often quite complex and include a substantial number of moving parts, rendering them expensive to produce and maintain. In addition, many such mechanisms incorporate external working parts such as pulleys and cables, which are exposed to damage from the elements, present a risk of injury to persons coming into contact with moving parts, and detract considerably from the external aesthetic appeal of the overall device. Also, the lift mechanisms of many such poles require specialized tools and equipment to operate and service, and often require a dedicated power source to drive the lift mechanism, adding further to the expense and complexity of the device.

U.S. Pat. No. 6,447,150 discloses a support pole for raising and lowering equipment, and is incorporated herein by reference. This support pole provides a cable transport mechanism for carrying an electrical cable connected to the equipment mounted on a carriage as the carriage is raised and lowered. A plug and socket arrangement allows the cable to be manually connected and disconnected from a power source, surveillance equipment, and/or other associated equipment. International Publication WO 01/75849 A2, also incorporated herein by reference, discloses another form of cable transport mechanism, wherein the cables are carried by pulleys. U.S. patent application Publication No. US-2003-0024144-A1, also incorporated herein by reference, discloses another support pole having similar means of cable transport.

Although such devices provide considerable advantage over previously known elevated support structures, it has now been discovered to be desirable to eliminate the need for transporting the cable with the carriage as it is raised and lowered, and to enable isolation of high-voltage cables from low-voltage cables in a support pole. It is to the provision of a pole and lifting device meeting these and other needs that the present invention is primarily directed.

SUMMARY OF THE INVENTION

The present invention provides an improved pole for supporting equipment such as surveillance cameras, lights, flags, signs, antennas and weather monitoring equipment in an elevated position a distance above the ground or some other base surface. The pole includes a lifting mechanism for raising and lowering the equipment between the elevated position and a lower position. In example embodiments described in greater detail herein, the pole of the present invention provides a relatively economical and aesthetically appealing device that is readily operable and easily serviced.

In further embodiments, the pole of the present invention includes one or more fixed conductors extending through the pole. For example, a high-voltage conductor can extend through a first channel of the pole, and a low-voltage conductor can extend through a second channel of the pole, to isolate the conductors from one another and thereby minimize or prevent interference with signals carried by the low-voltage conductor that could otherwise result from proximity with the high-voltage conductor. The conductor(s) is/are preferably connected to a first connection block at or near the top of the pole. A second connection block is preferably mounted to the carriage, and is positioned and configured to releasably engage the first connection block, directly or through one or more intermediate adapter(s), as the carriage moves into its raised position proximal the top of the pole to provide power to equipment mounted to the carriage and/or to communicate surveillance video and/or other signals between equipment mounted to the carriage and remote equipment.

In one aspect, the present invention is a support pole for supporting an object in an elevated position. The support pole preferably includes an elongate pole having a top and a bottom, and a channel extending at least partly between the top and the bottom. The support pole preferably also includes a threaded rod rotationally mounted within the channel, the rod comprising a detachable coupling for engaging a drive tool. The support pole preferably also includes a carriage in engagement with the threaded rod, whereby rotation of the rod imparts translational movement upon the carriage through the channel.

In another aspect, the present invention is a support pole for raising and lowering a supported object between a lower position and an elevated position. The support pole preferably includes an elongate pole having a top and a bottom, and a channel extending at least partly between the top and the bottom. The support pole preferably also includes a carriage translationally mounted within the channel. The support pole preferably also includes a drive mechanism for imparting translational movement of the carriage along the channel, wherein the drive mechanism is substantially housed within the elongate pole.

In another aspect, the present invention is a support pole for raising and lowering a supported object between a lower position and an elevated position. The support pole preferably includes an elongate pole having a top, a bottom, and a channel extending at least partly between the top and the bottom. The support pole preferably also includes a threaded rod rotationally mounted within the channel, the rod comprising a detachable coupling for engaging a drive tool. The support pole preferably also includes a carriage in engagement with the threaded rod, whereby rotation of the rod imparts translational movement upon the carriage through the channel, the carriage comprising a mounting bracket for attachment of the supported object. The support pole preferably also includes a an electrical source affixed in the upper portion of the elongate pole with a complimentary receiving end affixed to the carriage, whereby upward translational movement of the carriage completes the electrical circuit. In a preferred embodiment, detachable electrical connections allow the supported device to be lowered for servicing while the electrical source remains affixed in the upper region of the elongate pole 30.

In still another aspect, the present invention is a support pole including an elongate pole having a first end and a second end, and defining a channel extending at least partway between the first and second ends. The pole preferably further includes a first electrical coupling mounted at one end of the elongate pole, and at least one electrical conductor fixed to said elongate pole and in electrical connection with the first electrical coupling. The pole preferably also includes a carriage translationally mounted within the channel of the pole, and having a second electrical coupling mounted thereto for releasable engagement with the first electrical coupling. The pole preferably also includes a drive mechanism to translationally move the carriage along at least a portion of the pole's length and thereby bring the second electrical coupling into engagement with the first electrical coupling.

In another aspect, the present invention is a support pole including an elongate pole having a top and a bottom, and having a first electrical connector block at or near the top of the pole. The pole preferably also includes a carriage translationally mounted to the elongate pole, and a second electrical connector block mounted to the carriage. The pole preferably also includes a stabilizer frame sliding within the elongate pole, and having an intermediate electrical coupling for releasable engagement between the first and second electrical connector blocks.

In yet another aspect, the present invention is a support pole including an elongate pole having a top end and a bottom end, and having a first electrical coupling mounted proximal the top end of the pole. The pole preferably also includes a carriage translationally mounted to the pole, and a second electrical coupling for releasable engagement with the first electrical coupling when the carriage is in a raised position proximal the top end of the pole. The pole preferably also includes at least one guidepin providing alignment between the first and second electrical couplings as the carriage moves into the raised position.

These and other objects, features and advantages of example embodiments of the present invention are described in greater detail herein.

DETAILED DESCRIPTION

Figure 1A:
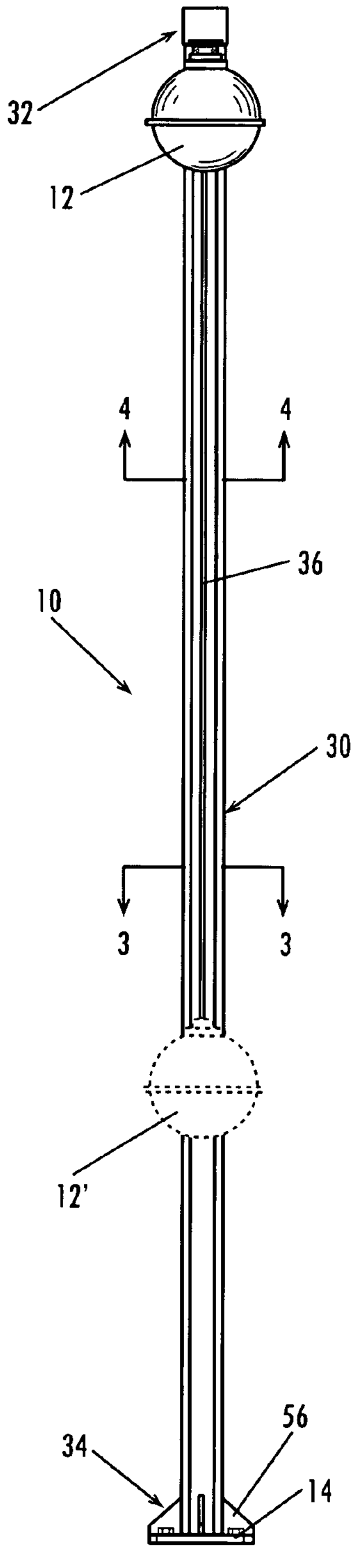
FIGS. 1*a* and 1*b* show front and side views, respectively, of a pole according to an example form of the present invention, supporting a surveillance camera housing in an elevated position, and in broken lines showing a surveillance camera housing in a lowered position.

Referring now to the drawing figures, wherein like reference numerals represent like parts throughout, preferred forms of the present invention will now be described. It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. In addition, as used in the specification including the appended claims, the singular forms "a," "an," and "the" include the plural, plural forms include the singular, and reference to a particular numerical value includes at least that particular value, unless the context clearly dictates otherwise. Furthermore, any methods described herein are not intended to be limited to the sequence of steps described but can be carried out in other sequences, unless expressly stated otherwise herein.

Figure 1B:
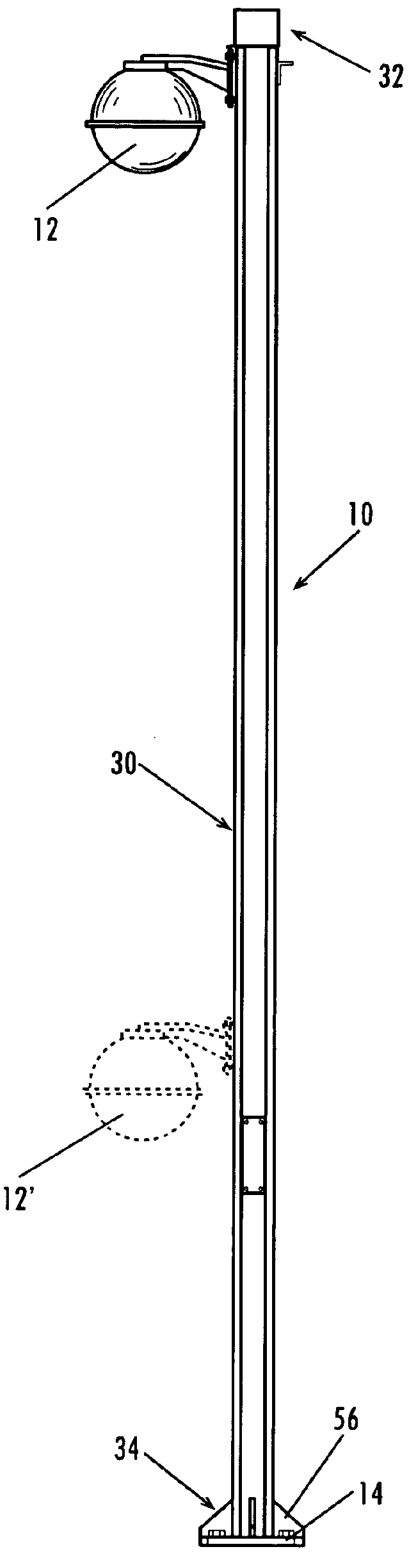
Figure 2A:
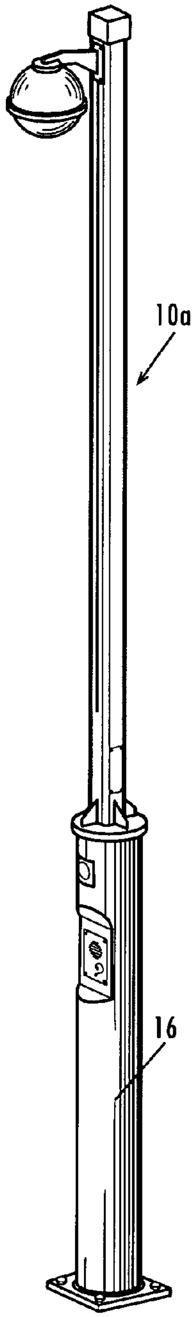
FIGS. 2*a*–2*d* show alternate mounting embodiments of a pole according to example forms of the present invention.
Figure 2B:
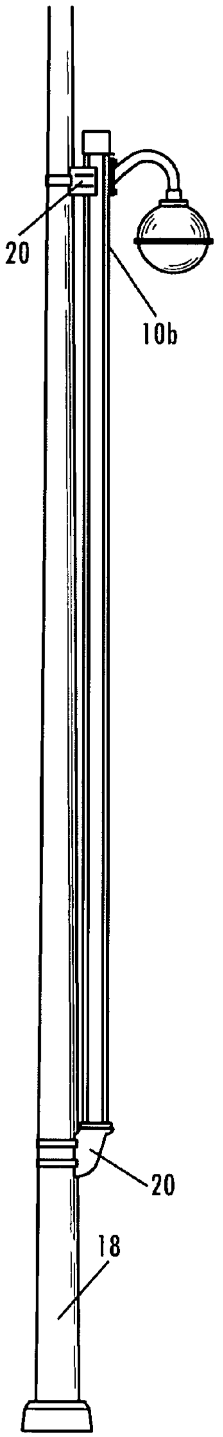
Figure 2C:
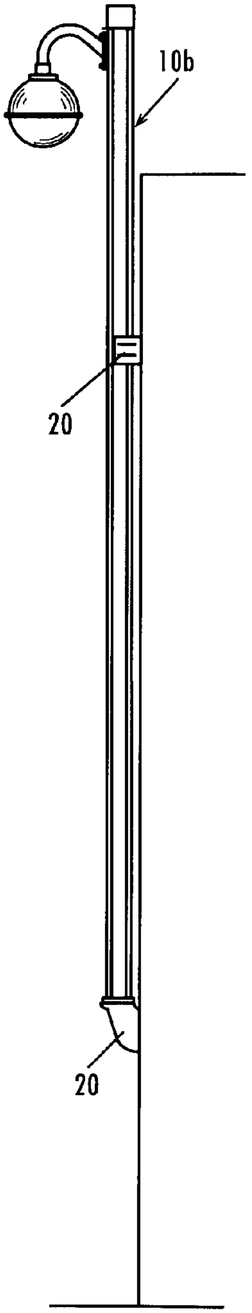
Figure 2D:
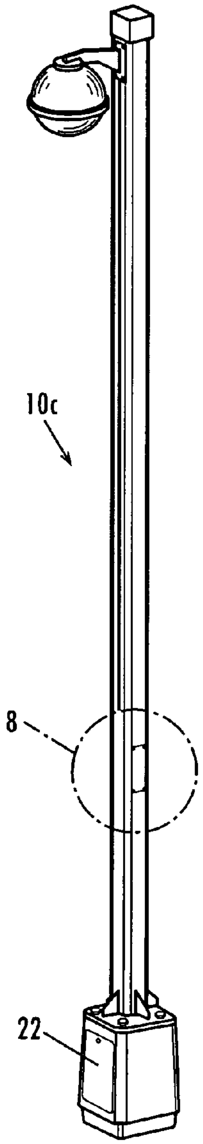

As seen with reference to FIGS. 1–2, the present invention is a support pole 10 for raising and lowering one or more supported objects 12, such as a surveillance camera, a light, an infrared illuminator, a flag, a banner, a sign, an antenna, weather monitoring equipment, and/or the like. The pole supports the object(s) 12 in an elevated position, shown in solid lines in FIGS. 1*a* and 1*b*, and permits the object(s) to be lowered to a lower position, shown in broken lines as element 12', for maintenance, installation, service, etc.

In one embodiment, described with reference to FIGS. 1*a* and 1*b*, the support pole 10 includes a base plate 14 for mounting to a sidewalk or other surface, as with anchor bolts or other attachment means. In an alternate embodiment shown in FIG. 2*a*, the support pole 10 is mounted to a telephone emergency call station 16. In another alternate embodiment shown in FIG. 2*b*, the support pole 10 is mounted to an existing pole such as a telephone pole or sign pole, preferably using mounting brackets 20. In still another alternate embodiment shown in FIG. 2*c*, the support pole 10 is mounted to a wall 18 or other structure. In yet another alternate embodiment shown in FIG. 2*d*, the support pole 10 is mounted to a transformer base 22 or other enclosure.

The support pole 10 preferably comprises an elongate pole portion 30, having a top 32, a bottom 34, and a channel 36 extending at least partly between the top and the bottom. The elongate pole portion 30 is preferably formed as an extrusion of a substantially rigid material such as aluminum, steel or plastic. In preferred form, the height of the elongate pole portion 30 is between about 10' to about 20', and most preferably about 16'. Of course, those skilled in the art will recognize that the height may be greater or less than the stated example dimensions, depending upon a particular intended application. For certain applications, the channel 36 will extend substantially the entire distance from the top 32 to the bottom 34, thereby allowing the supported object to be raised and lowered along substantially the entire length of the elongate pole portion 30. For example, if the support pole 10 is mounted to the top of a telephone call station 16, it may be desirable that the supported object 12 be lowered to immediately adjacent the bottom 34 of the elongate pole portion 30 to permit a person standing on the ground or on a short ladder to reach the supported object. For other applications, the channel 36 may extend along only a portion of the height of the elongate pole portion 30, ending a distance from either the top 32 or the bottom 34. For example, if the support pole 10 is mounted on the ground, it may be easier to service the supported object 12 at a position several feet above the ground than at ground level, in which instance the channel 36 need not extend all the way to the bottom 34 of the pole. Preferably, the lower position of the supported object 12 will be within or just above the reach of a person of average height, whereby a short ladder is utilized to access the supported object.

Above and below the channel 36, the elongate pole portion 30 is preferably a multi-sided or round extrusion having a partially hollow interior comprising one or more chambers extending substantially continuously along the height of the pole. For example, as seen with reference to FIGS. 3 and 4, the elongate pole portion 30 preferably comprises first and second side walls 40, 42, a back wall 44, and a front wall 46. Outer surfaces of the elongate pole portion 30 can optionally be provided with fluting or other decorative features, and/or informational indicia such as signage. One or more recesses are preferably formed in the outer surface of the pole 30 to receive changeable graphics for aesthetic, advertising or identification purposes. The front wall 46 preferably defines an opening or slot 48 extending at least partly along its length, defining the opening to the channel 36. A gasket 50 preferably seals the slot 48 to prevent external elements such as rain, dust, insects and debris from entering into the interior chambers of the pole, but to allow passage of a carriage (described below) through the slot. In preferred form, the gasket 50 comprises cooperating first and second ribs formed of a resilient material such as rubber. The elongate pole portion 30 is preferably extruded to include keeper slots on opposed sides of the slot 48 to hold the gasket ribs. Alternatively, the gasket 50 can be affixed along the slot 48 by fasteners or adhesive.

Figure 3:
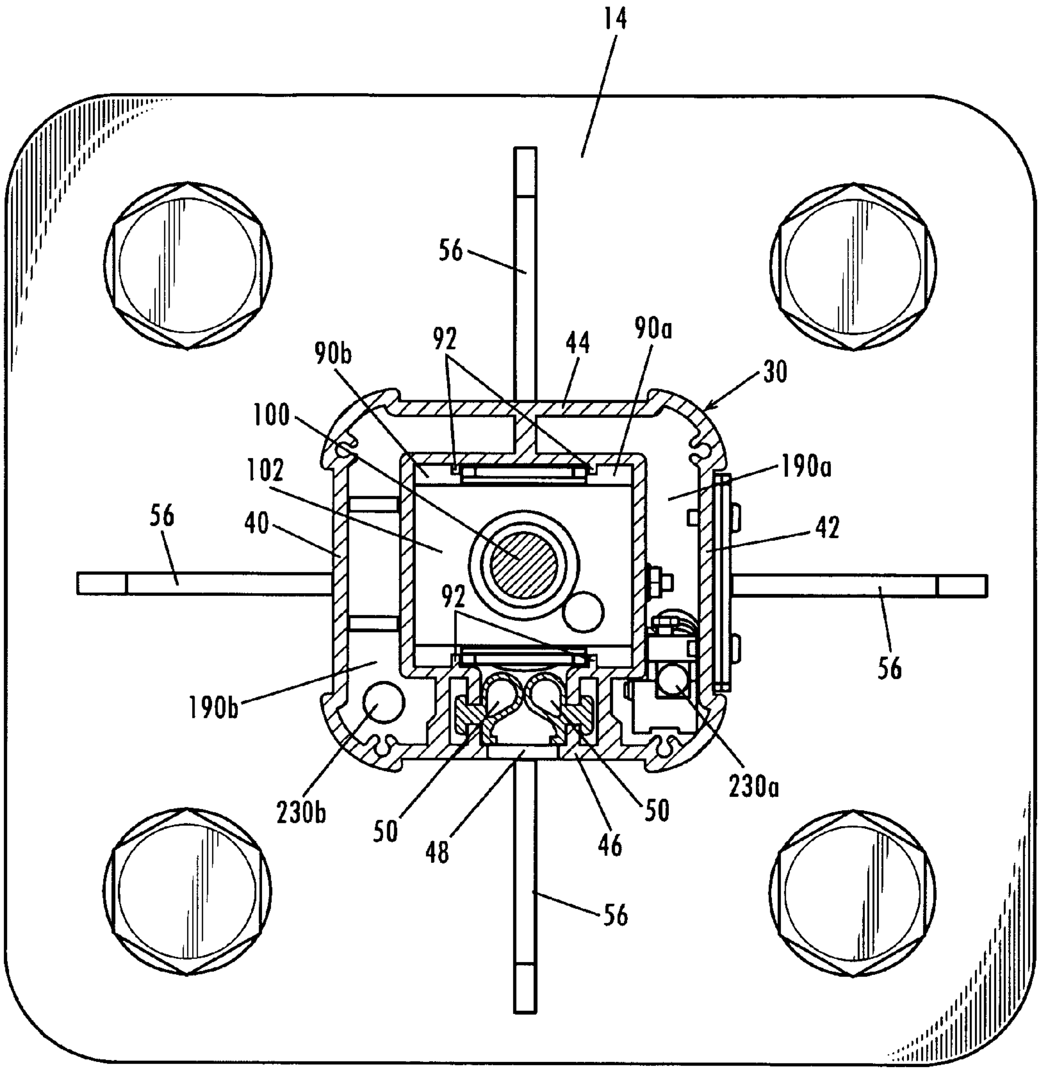
FIG. 3 shows a cross-sectional view of a portion of the pole of FIG. 1, taken at section line 3—3, according to an example form of the present invention.
Figure 4:
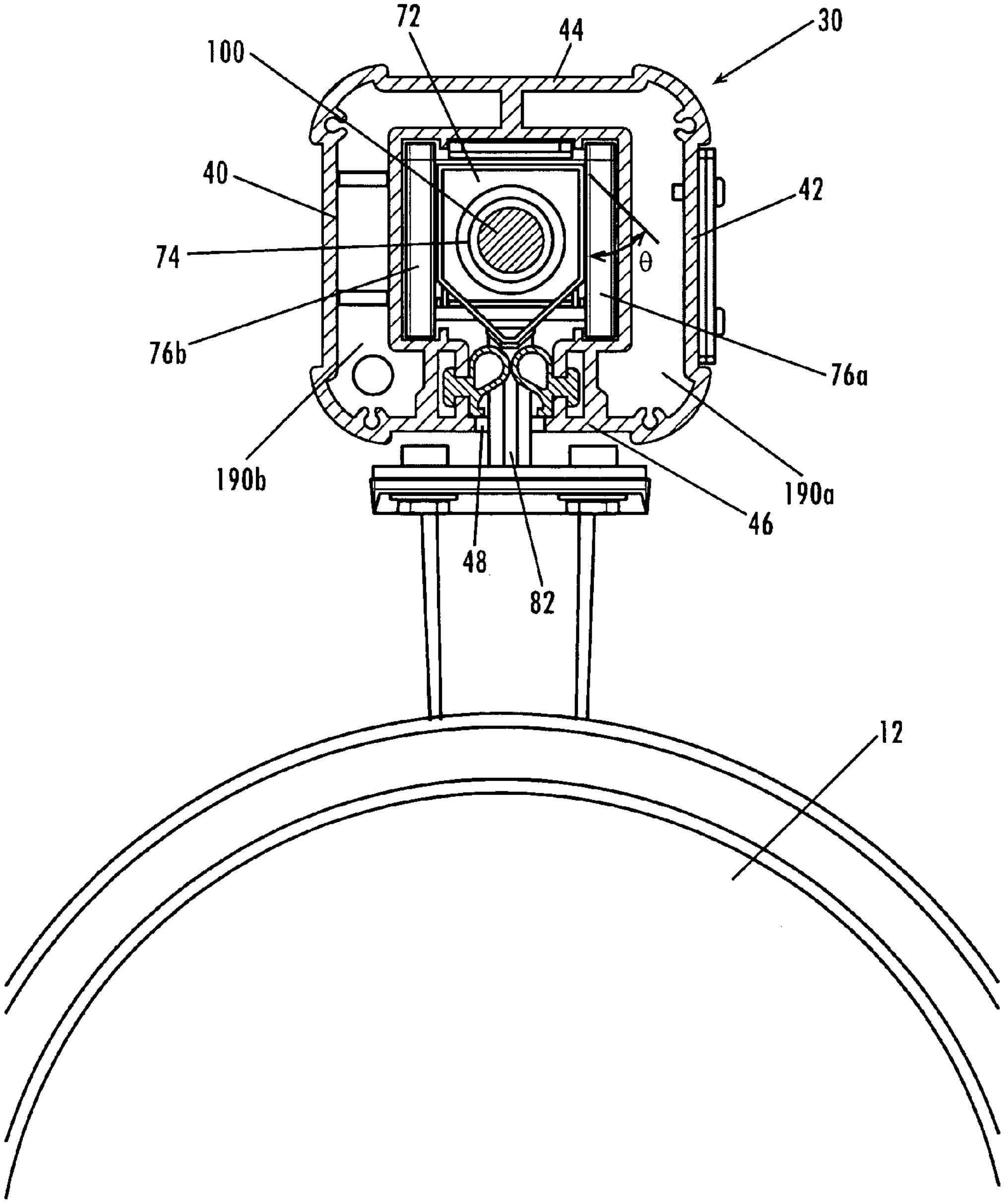
FIG. 4 shows another cross-sectional view of a portion of the pole of FIG. 1, taken at section line 4—4, according to an example form of the present invention.
Figure 5A:
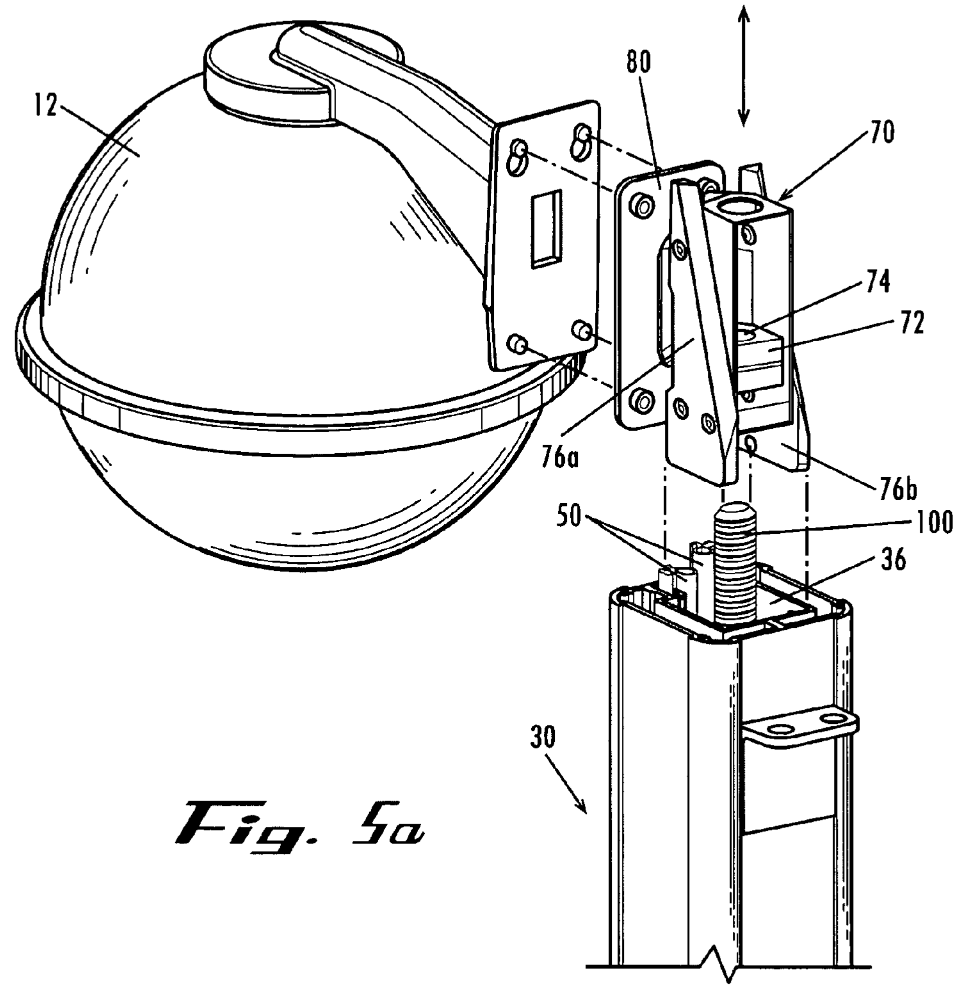
FIGS. 5*a* and 5*b* show an exploded perspective view and a top sectional view, respectively, of a carriage portion and elongate pole portion of the pole of FIG. 1, according to an example form of the present invention.
Figure 5B:
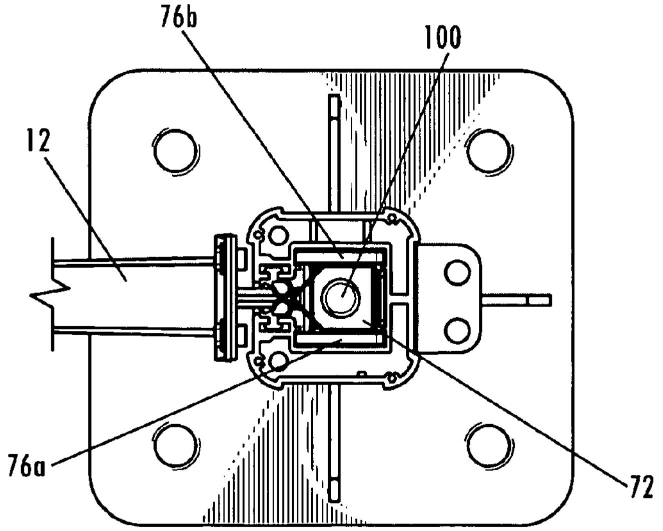
Figure 6A:
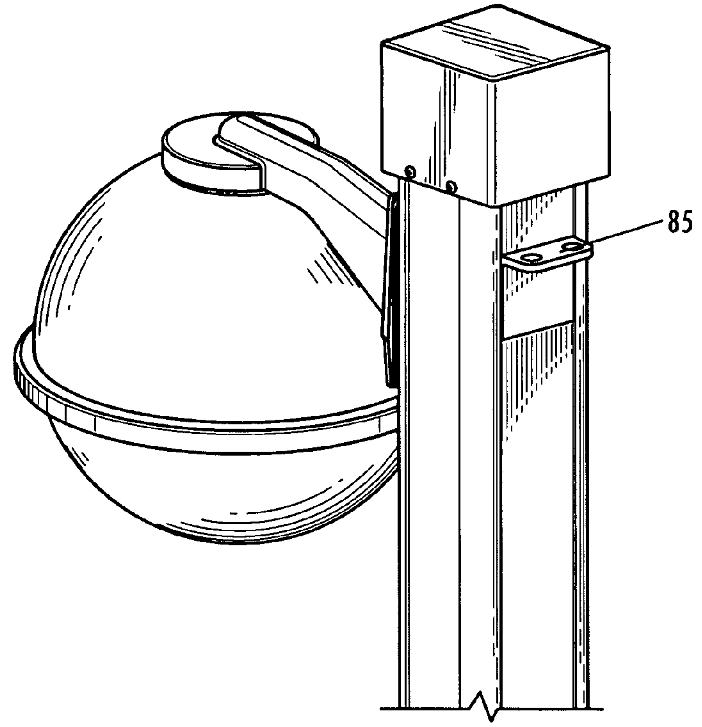
FIGS. 6*a* and *b* show a perspective view and a side elevational view, respectively, of an upper portion of the pole of FIG. 1, supporting a supported object in an elevated position.
Figure 6B:
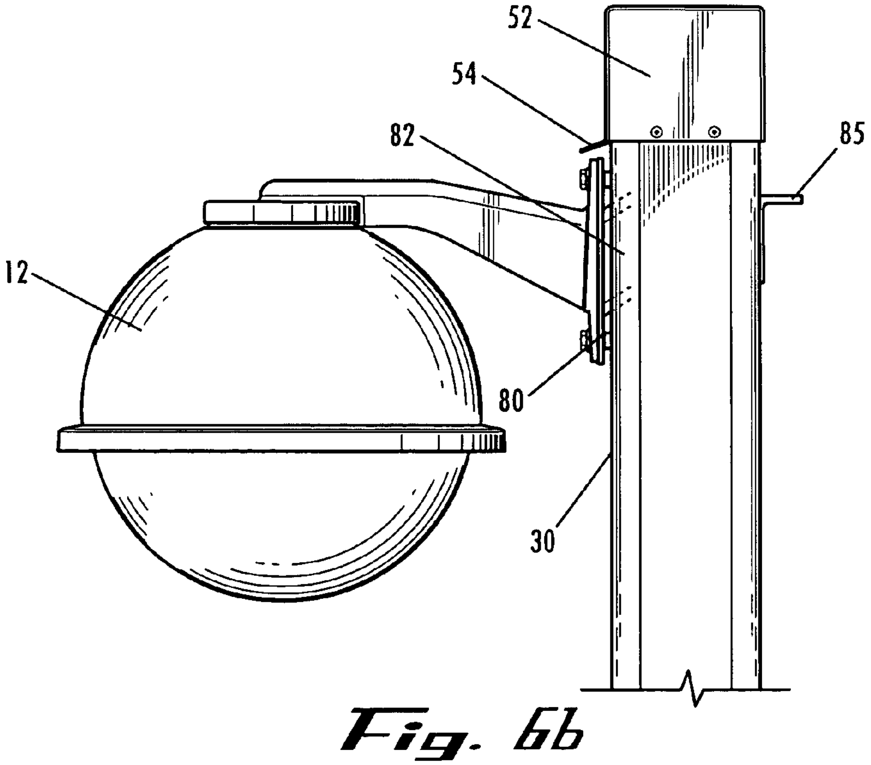

An endcap 52 is preferably attached at or integrally formed with the top 32 of the elongate pole portion 30, as can be seen with reference to FIGS. 6*a*, 6*b*. Alternatively, a flashing light or other indicator can be attached at the top 32 of the elongate pole portion 30, for example, to indicate the location of a telephone call station. The endcap 52 preferably comprises a drip ledge 54 overhanging the front wall 46 to prevent rain from running into the slot 48. A lifting bracket 85 is preferably affixed to the pole 10 adjacent the top 32. The lifting bracket 85 preferably comprises one or more openings or couplers for connection to a crane or other external lifting mechanism during installation, and/or for mounting a lightning rod or other component to the pole. One or more flanges 56 preferably provide structural bracing at the bottom 34 of the elongate pole portion 30, as shown in FIGS. 1 and 3. The bottom portion 34 of the pole preferably defines an interior chamber providing sufficient space to house any electronics and other equipment necessary for operation of the supported object.

With reference now to FIGS. 4–7, the support pole 10 preferably further comprises a carriage 70, mounted for translational movement within the channel 36, between a lower position and an elevated position. The carriage 70 preferably comprises a carriage body portion 72 defining a threaded bore 74 aligned generally coaxially with the elongate pole portion 30, and generally parallel to the slot 48 of the channel 36. The carriage 70 preferably further comprises one or more carriage guides 76. Most preferably, first and second carriage guides 76*a*, 76*b* are mounted on opposite sides of the carriage body 72. Each carriage guide 76 is preferably generally wedge-shaped when viewed from the side, in a viewing direction perpendicular to the axis of the bore 74; and is generally rectangular in cross-section when viewed end-on, in a viewing direction parallel to the axis of the bore 74. Each carriage guide 76 preferably includes a beveled, inclined surface 78, facing toward the top 32 of the elongate pole portion 30. For example, as seen best with reference to FIG. 7, the surface 78 is preferably inclined at an acute angle $\alpha$ relative to the axis of the bore 74; and as seen best with reference to FIG. 4, the surface 78 is preferably beveled at an angle $\theta$ relative to the sides of the carriage guide 76.

With reference now to FIGS. 4–7, the carriage preferably further comprises a mounting bracket 80 attached to the carriage body 72 by a connecting strut 82. The connecting strut 82 preferably traverses the slot 48 along the length of the channel 36, between and in sealing contact with the ribs of the gasket 50. The connecting strut 82 preferably has rounded edges to prevent damage to the gasket 50, and slopes downwardly from the carriage body 72 to the mounting bracket 80, toward the bottom 34 of the elongate pole portion 30, so that any rainwater contacting the strut 82 runs toward the exterior of the channel 36. The mounting bracket 80 is preferably a generally flat metal plate, offset a small distance outside the channel 36, and preferably does not physically contact the channel. The mounting bracket 80 preferably traverses immediately adjacent and external of the channel 36, and is sized and shaped to substantially cover any opening formed between the gasket 50 and the strut 82 as the gasket parts to permit passage of the strut, thereby excluding any rain or debris from entering the interior of the channel. The mounting bracket 80 preferably defines one or more holes 84 for receiving bolts or other fasteners for attaching a supported object 12 to the carriage 70. The holes 84 can be internally threaded or can be unthreaded through holes. The mounting bracket 80 preferably also defines a cable opening 86 for passing a cable connecting the supported object 12 to a remote location. The strut 82 preferably defines a conduit in communication with the cable opening 86, and a cable clamp 88 is preferably mounted to the carriage 70 for securing the cable thereto.

As seen best with reference to FIGS. 3–5 and FIG. 7, the elongate pole portion 30 preferably comprises one or more carriage guide tracks 90 extending lengthwise within the channel 36. Preferably, first and second guide tracks 90*a*, 90*b* are provided on opposite sides of the channel 36, extending generally parallel to and adjacent the sidewalls 40, 42. Each track 90*a*, 90*b* is preferably configured to engage a respective carriage guide 76*a*, 76*b*, and constrain the carriage 70 to translational movement along the longitudinal axis of the channel 36, thereby preventing any significant twisting, pivotal or transverse movement of the carriage. Each track 90*a*, 90*b* is preferably formed as part of the channel 36 by extruding an opposed pair of fins 92 along the interior front and back surfaces of the channel. The tracks 90*a*, 90*b* and the carriage guides 76*a*, 76*b* preferably comprise contacting surfaces presenting a low coefficient of friction, whereby the carriage 70 slides smoothly within the channel 36. For example, the tracks 90*a*, 90*b* are preferably formed of smooth aluminum, and the carriage guides 76*a*, 76*b* are preferably formed of ultra-high molecular weight (UHMW) polyethylene. In alternate embodiments, the tracks 90 may be periodically lubricated if needed, and/or self-lubricating materials of construction can be utilized.

The support pole 10 preferably further comprises a drive mechanism for imparting translational movement of the carriage 70 along the channel. In preferred form, the drive mechanism is substantially entirely housed within the elongate pole 30, thereby protecting the drive mechanism from the elements, shielding personnel from injury by contact with moving parts, and improving the aesthetics of the overall device. With particular reference now to FIGS. 3–5, 8 and 9, the drive mechanism preferably comprises a threaded rod 100 rotationally mounted within the channel 36, and extending between the elevated position and the lower position. The threaded rod is preferably between about ¾" to 1" in diameter, and has an Acme single thread profile with a pitch of about six threads per inch (6 tpi). Of course, the size and thread characteristics may vary depending upon the particular application. A support bracket or block 102 is preferably mounted in the base of the elongate pole portion 30, adjacent or proximal the bottom 34, for supporting the threaded rod 100. A bearing 104 is preferably provided between the support bracket 102 and the threaded rod 100 to facilitate smooth rotation and constrain the bottom end of the rod in position, preventing any significant axial or transverse motion of the rod. A top plate 106 is preferably mounted at the top 32 of the elongate pole portion 30, and defines an opening and/or bearing 108 constraining the top end of the rod 100 to rotational motion. The threaded rod 100 preferably engages the threaded bore 74 of the carriage 70, whereby rotation of the rod 100 imparts translational movement upon the carriage 70 through the channel 36. Rotation of the rod 100 in a first rotational direction (e.g., clockwise) thereby imparts translation of the carriage 70 along the channel 36 in a first direction (e.g., upwardly), and rotation of the rod 100 in a second rotational direction (e.g., counter-clockwise) thereby imparts translation of the carriage 70 along the channel 36 in a second direction (e.g., downwardly).

Figure 10:
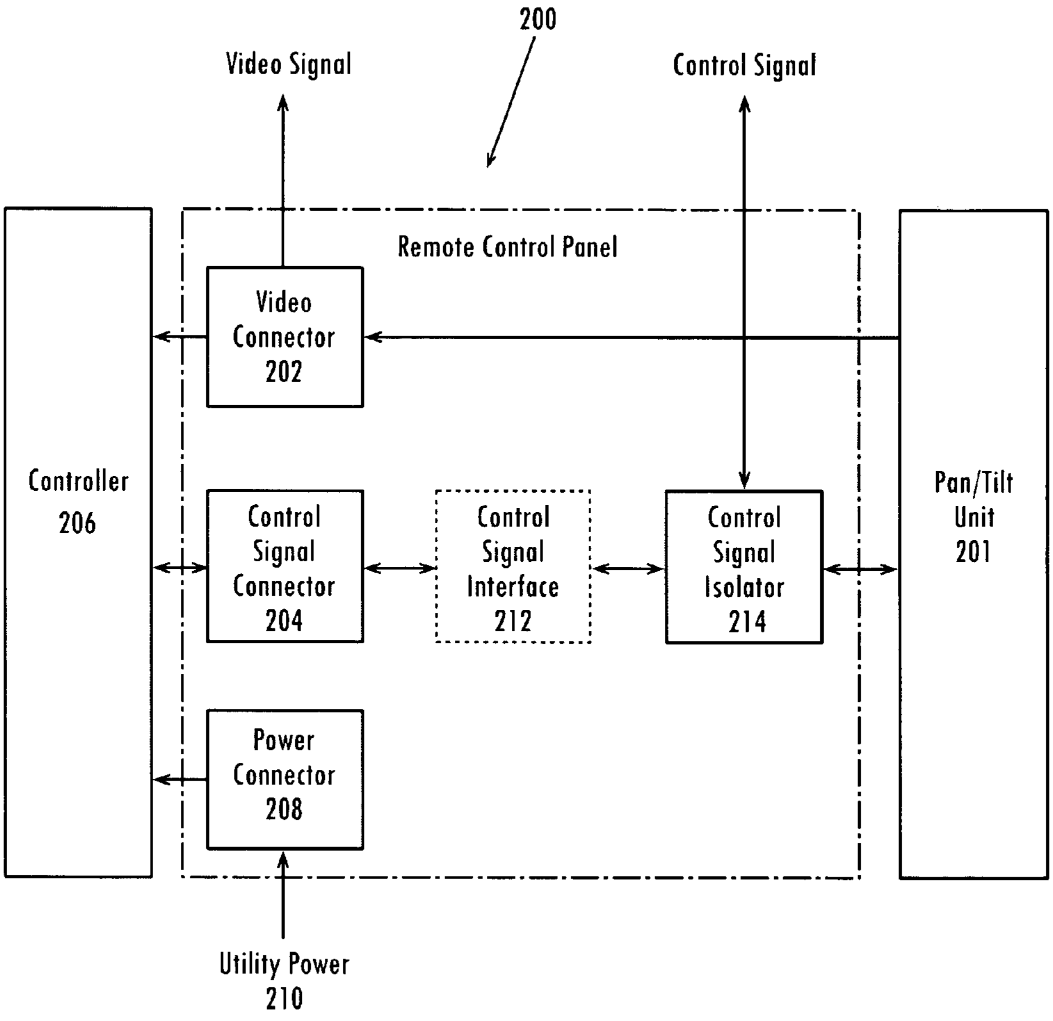
FIG. 10 shows a schematic diagram of a remote control panel of the present invention, according to an example form.

The threaded rod 100 is preferably connected to a detachable coupling for engagement of a drive tool 128. For example, the lower end of the rod 100 preferably comprises a first element of a detachable coupling 119, adapted to cooperatively engage a second detachable coupling element of a flexible drive shaft 120 at a first end 121 of the flexible drive shaft. Alternatively, the flexible drive shaft 120 can be permanently coupled to the rod 100. The second end 122 of the flexible drive shaft 120 is preferably releasably or permanently coupled to a drive tool 128. The drive tool 128 can be manually driven, such as a wrench or a handcrank, or can be power driven, such as an electrical or pneumatic motor. In a particularly preferred form, the coupling is adapted to detachably couple with a portable cordless drill-motor. The flexible drive shaft 120 can be permanently or detachably coupled to the threaded rod 100. In preferred form, and as seen with reference to FIGS. 9 and 10, the flexible drive shaft 120 has a length that permits the shaft to be housed within the interior of the base of the elongate pole portion 30, beneath the support bracket 102, when not in use; and to be accessed for use through an access opening 124 in the elongate pole portion 30, whereby the coupling 122 can be withdrawn to a position external of the elongate pole portion 30 for connection to the drive tool. A cover plate 126 preferably covers the access opening 124 when the drive shaft 120 is not in use. In alternate embodiments, the entire drive mechanism is housed within the pole. For example, the pole can include an electrical drive motor mounted within its base portion and having an output drive coupled to the threaded rod 100.

In many instances, the supported object 12 must be coupled, electronically or otherwise, to one or more remote devices and/or power sources. For example, a supported surveillance camera is typically coupled electronically and/or optically to a remote power source and to remote monitoring and/or recording devices. The present invention optionally comprises a remote control panel 200 mounted to the base of the support pole 10, which allows a user to verify the operation of a pan/tilt mechanism 201 of a surveillance camera housing carried as the supported object 12 in certain particular applications of the support pole. Provision of the remote control panel 200 permits testing of the pan/tilt mechanism 201 without the need for climbing a ladder or lowering the camera housing. As seen best with reference to FIG. 10, the remote control panel 200 preferably comprises a video connector 202 for connection to an external video monitor. The remote control panel 200 preferably further comprises a control signal connector 204 for connection of an external controller 206, such as a programmed computer, for selectively controlling the pan/tilt mechanism 201. A power connector 208 for connection to an external power source 210, and/or an internal power source (unshown) are also preferably provided. The remote control panel 200 is preferably connected to the communication and video lines that are used to normally control the pan/tilt mechanism 201 and transmit video signals, but does not affect the normal operation of the pan/tilt mechanism. Video output signals from the supported surveillance camera are transmitted via the video connector 202 to the connected video monitor as the controller 206 is operated to actuate the pan/tilt mechanism 201. The user observes the displayed image on the video monitor to verify the operation of the pan/tilt mechanism 201. The remote control panel 200 preferably also comprises a control signal interface 212 for converting the electrical signal levels from the controller 206 to the electrical signal levels of the pan/tilt mechanism 201. The remote control panel 200 preferably also comprises a control signal isolator 214 for isolating control wires from external equipment. The control signal isolator 214 can comprise means for manually isolating control wires from external equipment, or alternatively can comprise means for automatically isolating control wires from external equipment by detecting the presence of signals from the controller 206.

Figure 11:
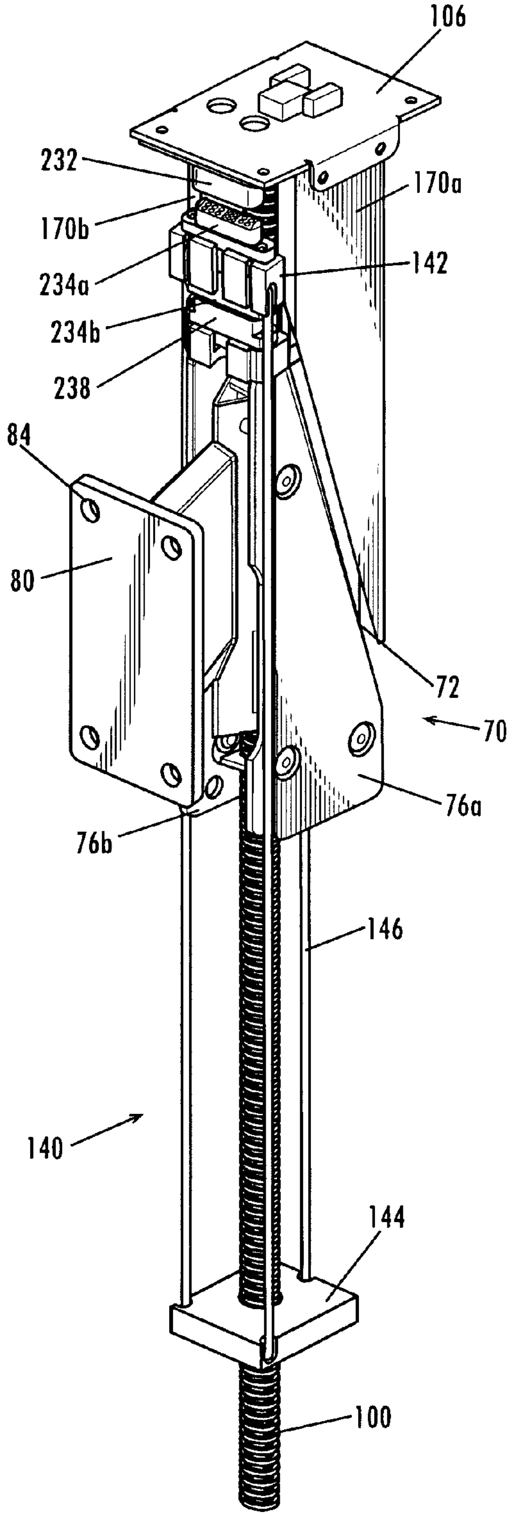
FIG. 11 is a perspective view of an electrical connection subsystem portion of the pole according to an example form of the invention.
Figure 12:
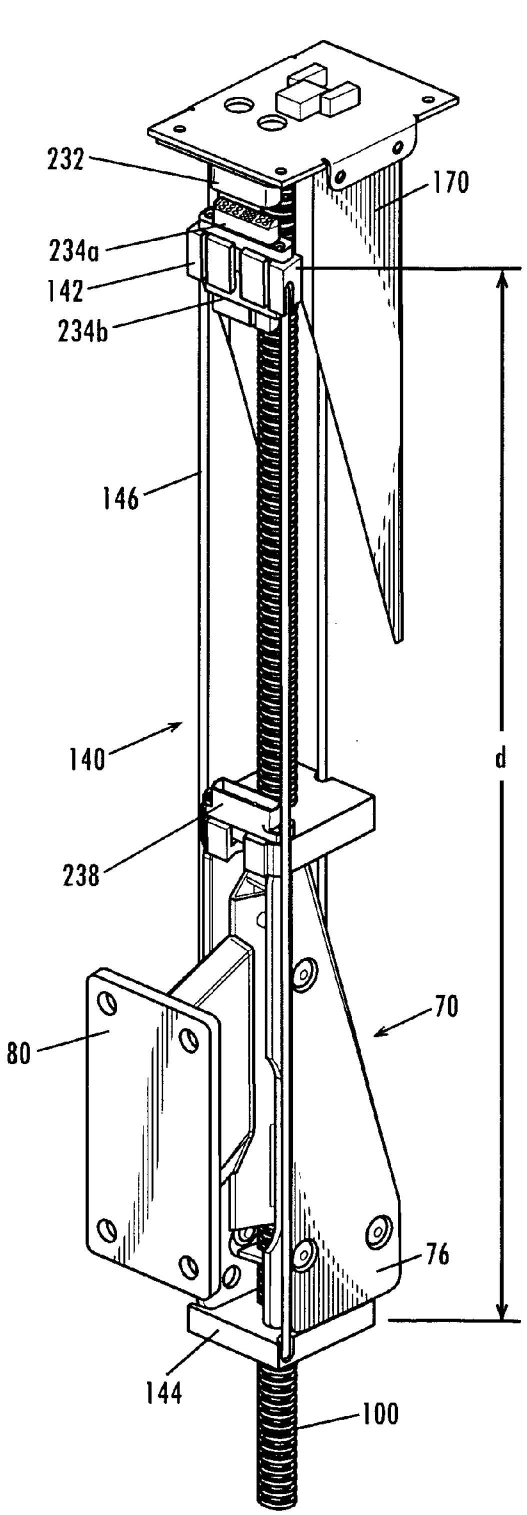
FIG. 12 is another perspective view of the electrical connection subsystem portion of the pole shown in FIG. 11.

With reference to FIGS. 11 and 12, the support pole 10 preferably further comprises a stabilizer frame 140, for bracing the threaded rod 100 to reduce vibration during rotation of the rod 100. The stabilizer frame generally comprises an upper stabilizer block 142, a lower stabilizer block 144 spaced a distance d from the upper plate, and one or more connecting members 146 extending between the upper and lower blocks. The distance d is preferably about ⅓ to ½ the length of the threaded rod 100. Each of the upper and lower blocks 142, 144 define an opening 148, 150 having an inner diameter approximately equal to or slightly larger than the outer diameter of the threaded rod 100. The upper and lower blocks 142, 144 are preferably formed of UHMW polyethylene or other low-friction material. The stabilizer frame is mounted within the channel 36, with the threaded rod 100 engaged within the openings 148, 150, and with the carriage 70 between the upper and lower blocks 142, 144. The upper and lower blocks 142, 144 are preferably sized and shaped to slide in close registration within the channel 36, for example, between the fins 92 forming the guide tracks 90. In this manner, the upper and lower blocks provide bracing against lateral vibration of the rod 100 as the rod is rotated. The stabilizer frame is preferably carried along with the carriage 70 as the carriage traverses the channel 36. For example, if the distance d between the upper and lower blocks 142, 144 is about, ½ the length of the threaded rod 100, the upper block 142 will brace the threaded rod near the midpoint of the rod's length when the carriage 70 is below the midpoint of the rod's length. As the carriage 70 moves upwardly along the channel 36, the top of the carriage will contact the upper block 142, and carry the stabilizer frame 140 upwardly through the channel. When the carriage 70 reaches the top of the channel, the lower block 144 of the stabilizer frame 140 will be positioned at about the midpoint of the threaded rod 100. Because the threaded rod 100 is constrained against lateral deflection at its top and bottom ends by bearings 108, 104, respectively, in the absence of the bracing provided by the stabilizer frame, the rod would be prone to maximum vibratory deflection at or near its midpoint. Thus, by providing a stabilizer frame having a distance d between blocks 142, 144 of ⅓ to ½ the length of the rod 100, the threaded rod is braced at or near the point of greatest susceptibility to vibration throughout the traverse of the carriage 70.

Figure 7:
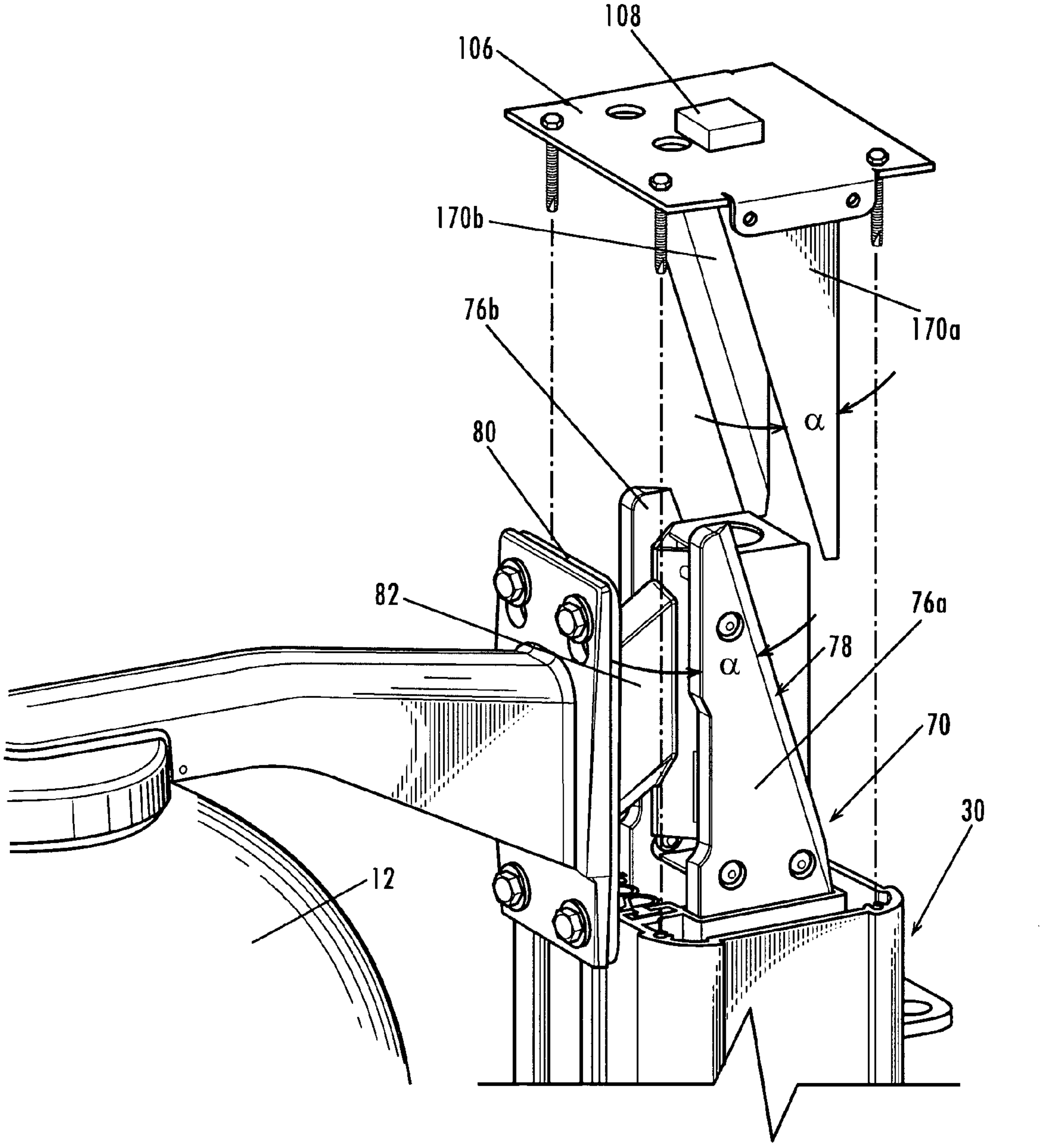
FIG. 7 is an exploded perspective view of the carriage of FIG. 1 being received within the pole, according to a preferred form of the present invention.
Figure 8:
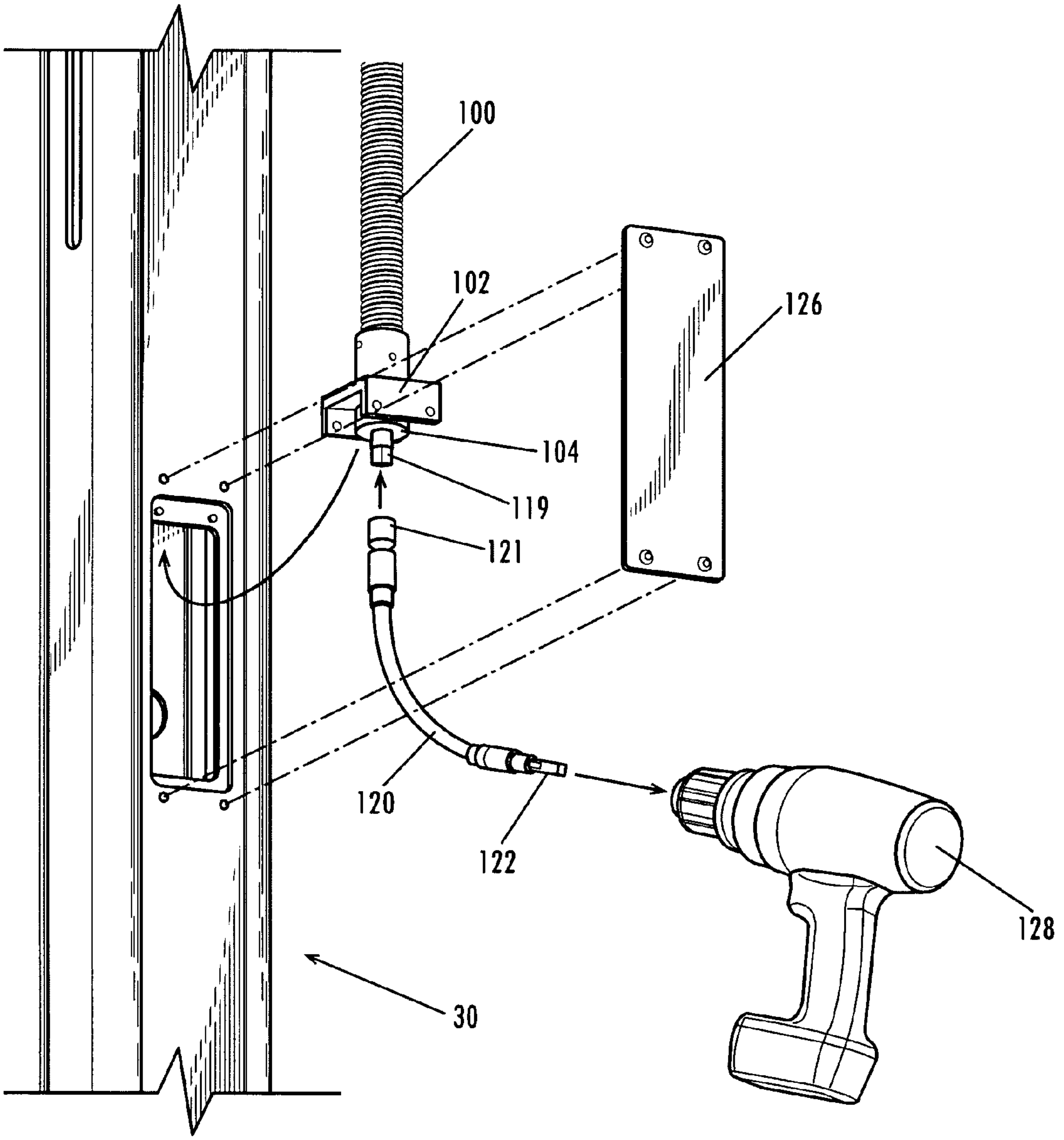
FIG. 8 is an exploded perspective view showing details of drive portions of the pole of FIG. 1, according to an example form of the present invention.
Figure 9:
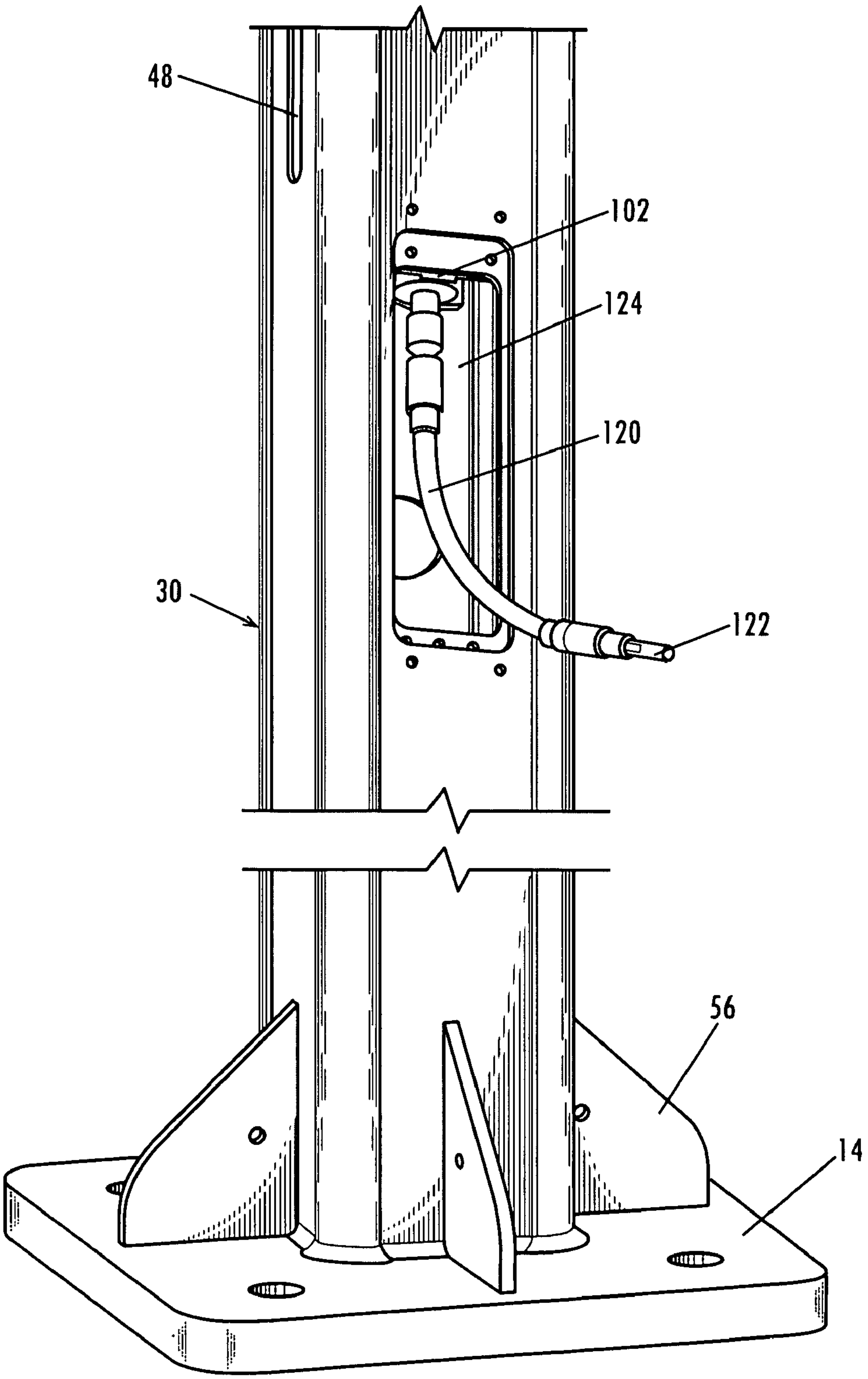
FIG. 9 is an assembled perspective view of a base portion of the pole of FIG. 1, according to a preferred form of the present invention, showing a flexible drive shaft portion extended out of the pole's interior.

The support pole 10 of the present invention preferably further comprises at least one carriage lock, which will be described with particular reference to FIGS. 7, 11 and 12. In preferred form, a pair of carriage locks 170*a*, 170*b* are affixed within the guide tracks 90*a*, 90*b*, adjacent the top 32 of the elongate pole 30, for example by attachment to the top plate 106. The carriage locks 170*a*, 170*b* preferably comprise beveled, inclined surfaces supplementary to the beveled, inclined surfaces 78 of the carriage guides 76*a*, 76*b*. As the carriage 70 is raised into the elevated position adjacent the top 32 of the elongate pole 30, the beveled, inclined surfaces of the carriage guides 76*a*, 76*b* contact and engage the beveled, inclined surfaces of the carriage locks 170*a*, 170*b* to lock the carriage 70 in position and thereby prevent vibration and lateral movement of the supported object 12 in the elevated position. The cooperating beveled, inclined surfaces provide increased surface area of contact between the carriage locks 170*a*, 170*b* and the carriage guides 76*a*, 76*b*, and provide compressive forces therebetween in both an axial and a lateral direction, thereby providing more solid bracing against movement and vibration than would be provided by contact between non-inclined and/or non-beveled surfaces.

The support pole 10 of the present invention preferably further comprises an electrical connection mechanism or subsystem for providing electrical power to a supported object 12 mounted on the carriage 70, and/or for providing signal communication between the supported object to a remote device when the carriage is in its raised or elevated position. Electric power and/or signals is/are conducted to the upper portion of the elongate pole 30 by one or more fixed wires or electrical conductors extending through at least a portion of the length of the pole. For example, as shown in FIG. 3, high-voltage conductors 230*a* are fixedly mounted within a first cable duct 190*a*, and low-voltage conductors 230*b* are fixedly mounted within a second cable duct 190*b*, which are preferably isolated and/or electrically shielded from one another, for example by arrangement of the cable ducts 190*a*, 190*b* on opposite sides of the channel 36. The high-voltage conductor may carry, for example, 120V or 240V AC for powering a light source; and the low voltage conductor may carry, for example, 12V or 24V AC or DC for powering a surveillance camera, and/or signal voltage from a camera to a display monitor or the like. The fixed mounting of the conductors in the pole prevents possible damage to the conductors, such as compromising their insulation or detaching wire connections, which could result from movement of the conductors through the pole. The provision of separate cable ducts for high-voltage and low-voltage conductors reduces or eliminates potential interference with low-voltage signals that could result from proximity to high-voltage conductors, allows one set of conductors to be accessed without the need for de-energizing the other, and reduces any likelihood of confusion between conductors during installation or repair.

The pole 10 of the present invention preferably further comprises at least one detachable electrical coupling configured for automatic connection of the fixed conductors 230 to equipment mounted on the carriage 70 when the carriage is brought into its raised position, and for automatic disconnection of the equipment from the conductors as the carriage is lowered out of its raised position. In this manner, power and/or signals are communicated between the elevated equipment and one or more remote sources or monitoring stations during normal operation, but the equipment is de-energized when lowered for repair or inspection, thereby reducing risk of injury to repair personnel. This arrangement also eliminates the need for cable transport within the pole as the equipment is raised and lowered, thereby reducing complexity and cost of the equipment and eliminating the risk of damage to cables and associated equipment during transport; and also eliminates the need for manually connecting and disconnecting the equipment when the carriage is to be raised or lowered.

In the example embodiment depicted in FIGS. 11–16, the at least one fixed conductor(s) 230 are electrically connected to a first connector block 232 mounted at or adjacent the top end 32 of the elongate pole 30, for example by attachment to the top plate 106. A second connector block 238 is mounted to or integrally formed with the carriage 70, and is configured for releasable engagement with the first connector block 232 to provide an electrically-conductive connection between the conductors 230 and the equipment mounted to the carriage when the carriage is in its raised position. The second connector block 238 is preferably affixed between the connector strut 82 and the bore 74 of carriage body 72 so as to not impede rotation of the rod 100. The second connector block 238 is preferably in electrical connection with the supported object 12 via a cable or conductor extending through the connector strut 82.

Figure 16:
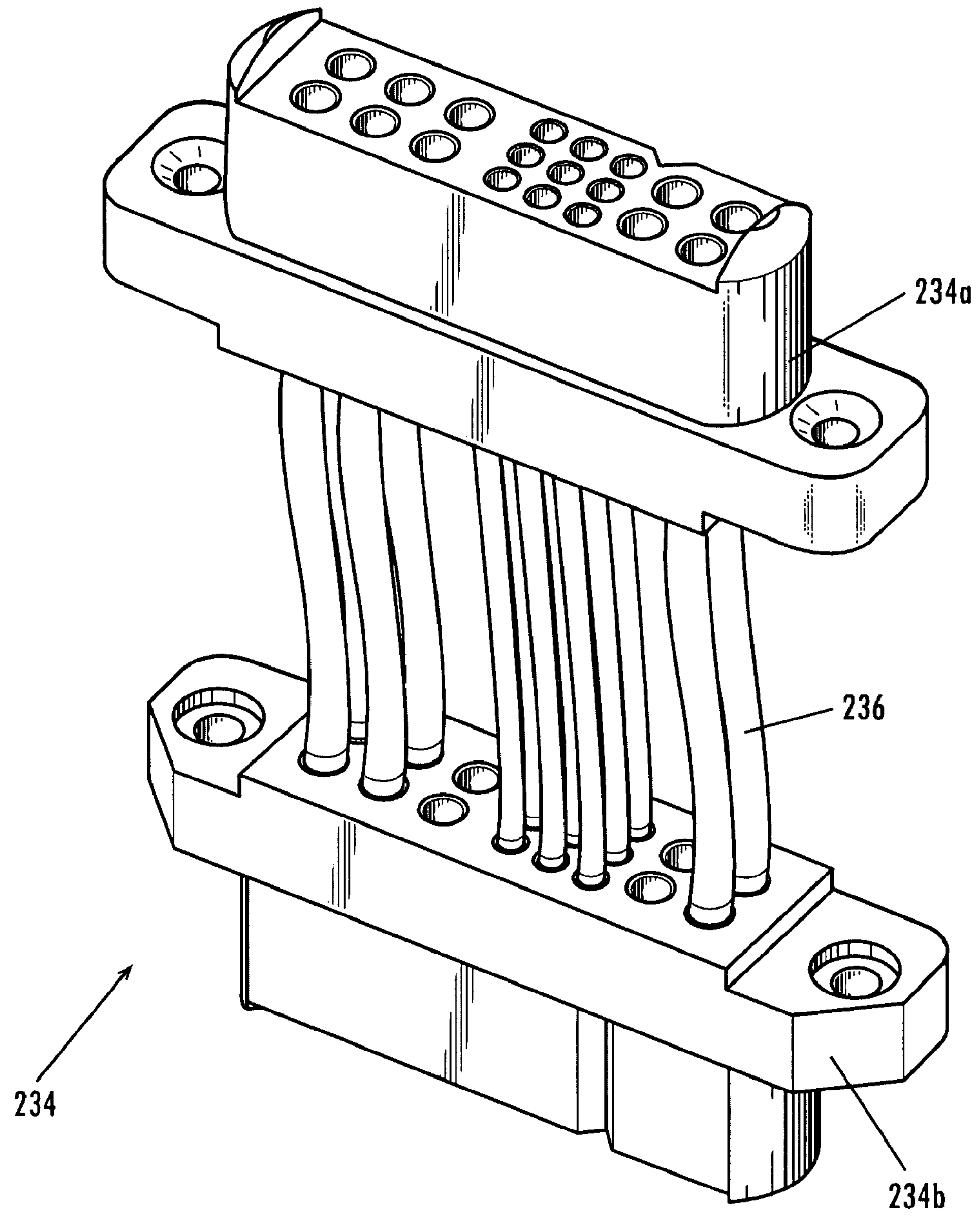
FIG. 16 is a detailed perspective view of connector block portions of the electrical connection subsystem of the pole shown in FIG. 11.

The first and second connector blocks 232, 238 can be interengaging couplings configured for direct engagement and disengagement therebetween, as for example in the form of male and female plug and socket electrical connectors. Alternatively, and with reference to FIGS. 13 and 14, the first and second connector blocks 232, 238 indirectly engage and disengage one another through an intermediate coupling 234. In the depicted embodiment, the intermediate coupling 234 is mounted to or integrally formed with the upper stabilizing block 142 of the stabilizer frame 140. The intermediate coupling 234 preferably comprises an upper electrical interface 234*a* for releasable engagement and electrical connection with the first connector block 232, and a lower electrical interface 234*b* for releasable engagement and electrical connection with the second connector block 238. The upper and lower electrical interfaces 234*a*, 234*b* are preferably connected by wires 236 or other conductors as shown in FIG. 16. In one example embodiment, the intermediate coupling 234 and the first and second connector blocks 232, 238 comprise Goldfish power connectors, Part Nos. GFSH109FIH and/or GFSH109MIH, commercially available from Positronic Industries of Springfield, Mo.

Figure 13:
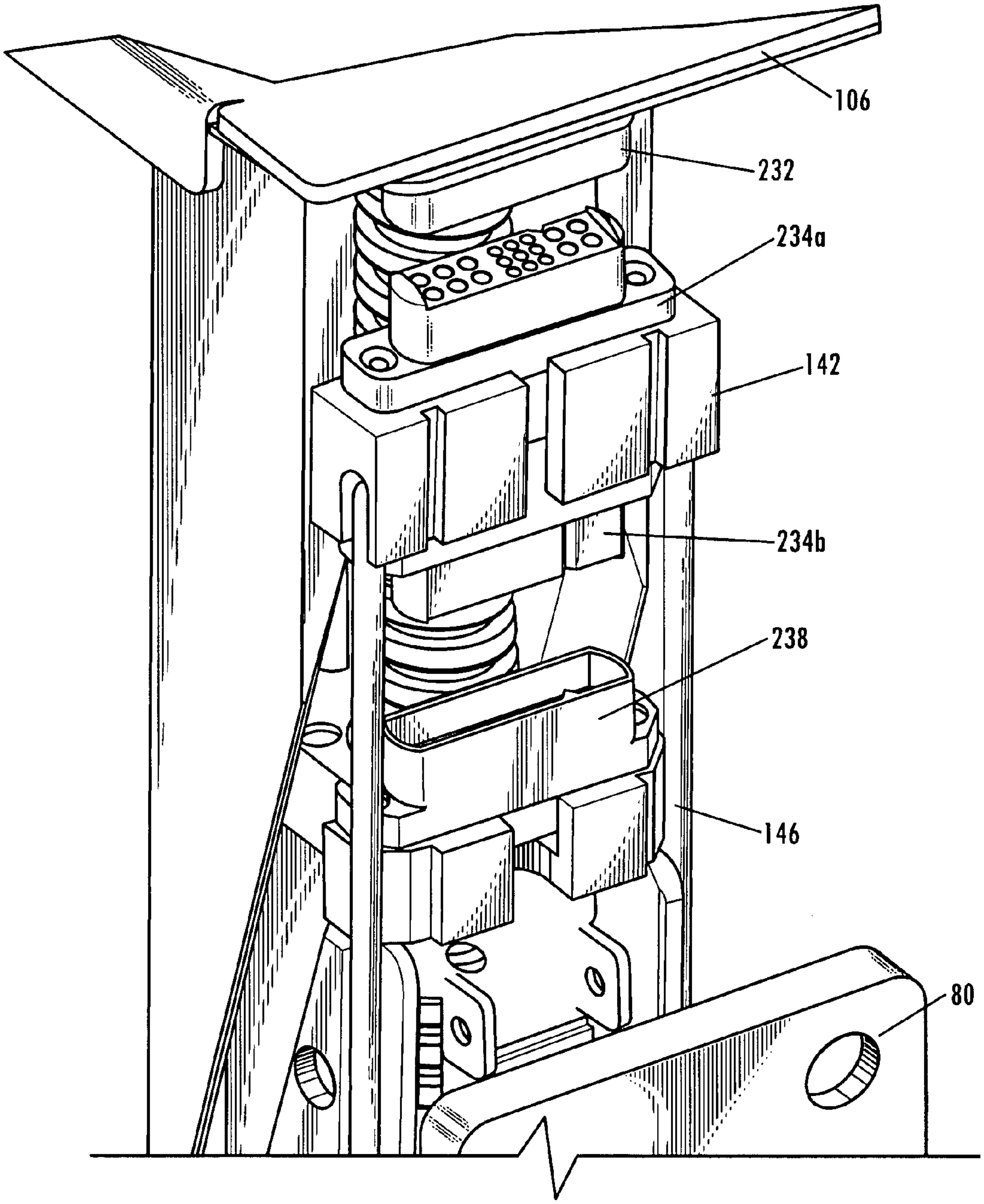
FIG. 13 is a detailed perspective view of the electrical connection subsystem portion of the pole shown in FIG. 11.
Figure 14:
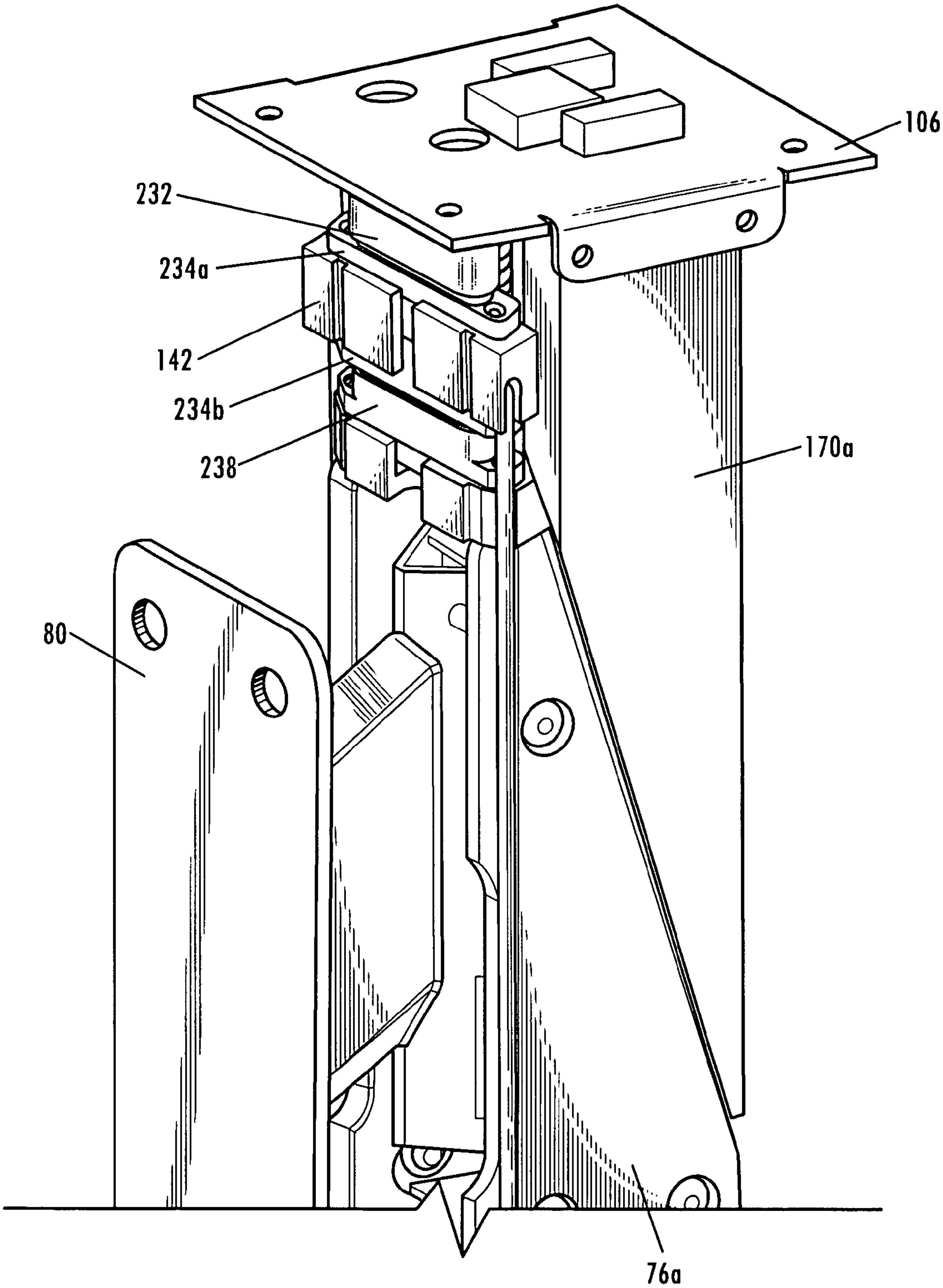
FIG. 14 is another perspective view of the electrical connection subsystem portion of the pole shown in FIG. 11, shown as it is brought into engagement for electrical connection.

As shown in FIGS. 11 and 13, as the carriage 70 is raised through the channel 36 toward its raised position (shown in solid lines in FIG. 1), the second connector block 238 is brought into engagement with the lower electrical interface 234*b*. The carriage carries the stabilizer frame 140 upwardly as described above. Upon reaching the raised position, the carriage 70 drives the upper electrical interface 234*a* into connection with the first connector block 232, as shown in FIG. 14, thereby automatically completing the electrical connection between the conductor(s) 230 and the equipment mounted on the carriage 70. Upon lowering of the carriage 70 from its raised position toward its lowered position, the second connector block 238 is disengaged from the lower electrical interface 234*b*, and/or the upper electrical interface 234*a* is disengaged from the first connector block 232, as shown in FIG. 12. As the carriage continues downward, the carriage contacts the lower stabilizer block 144, and drives the stabilizer frame 140 downwardly as described above, completing the disengagement of the components, and automatically disconnecting the conductor(s) 230 from the equipment mounted on the carriage 70.

Figure 15:
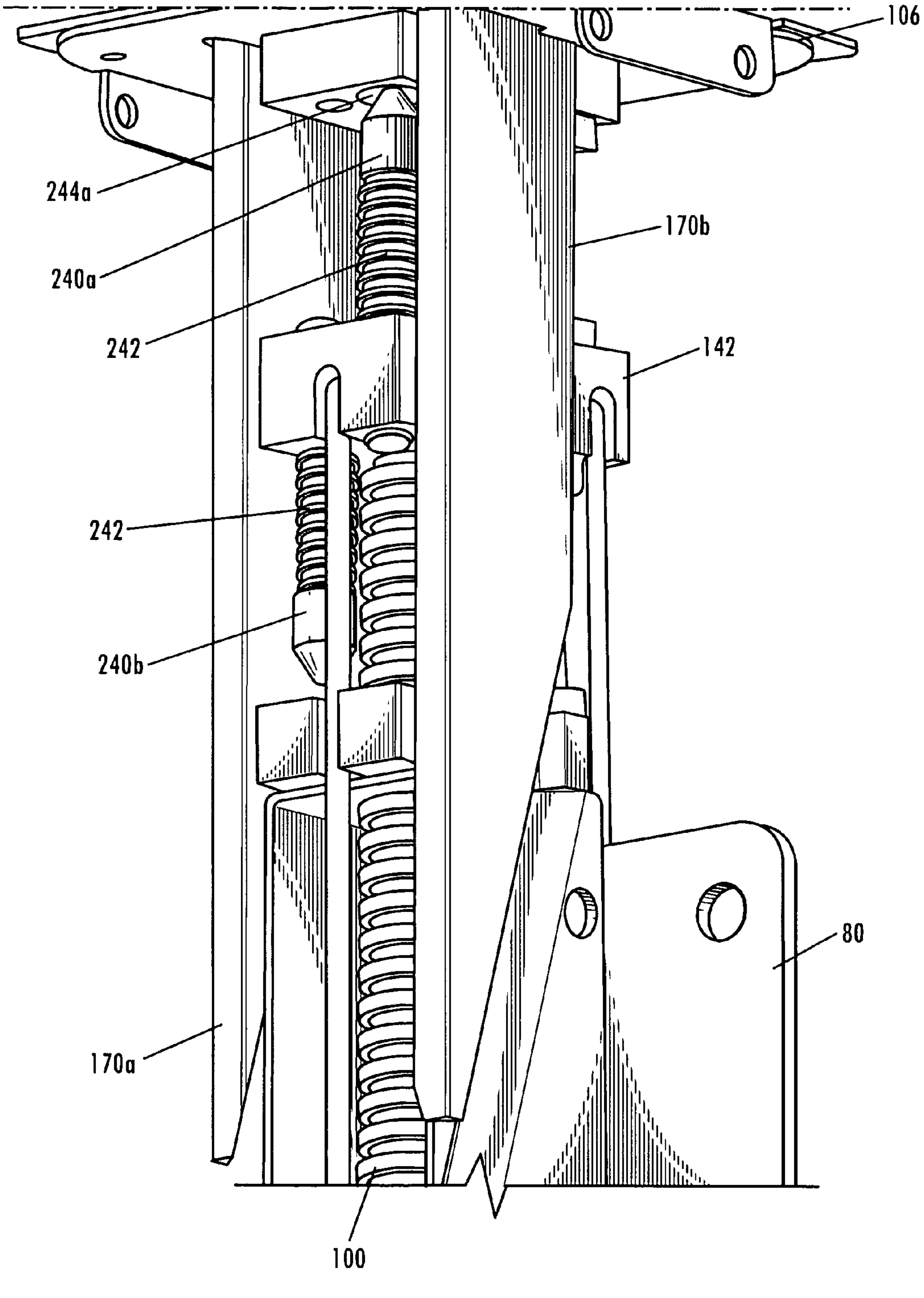
FIG. 15 is a rear perspective view of the electrical connection subsystem portion of the pole shown in FIG. 11.

To reduce noise and potential damage to components, it is preferable to slow the velocity of the carriage 70 as it approaches the raised position. It is also preferable to provide for precise alignment of the electrical couplings as they are brought into connection. With reference now to FIG. 15, the present invention preferably further comprises one or more guidepins 240 (upper and a lower guidepins 240*a*, 240*b* are depicted) mounted to the upper stabilizer block 142 of the stabilizer frame 140 for engagement within one or more cooperating recesses 244*a*, 244*b* formed in or adjacent the first connector block 232 and the second connector block 238 respectively. Alternatively, the guidepins can project from one or both connector blocks and the recess(es) can be formed in the upper stabilizer block. The guidepins preferably are collapsible and biased outwardly by springs 242 to absorb impact forces and to slow the carriage as it enters the raised position. In alternate embodiments, hydraulics, padded surfaces, and/or other elements can be provided in place of the springs 242 to slow the carriage and reduce impact. As the carriage 70 is raised into its elevated position, the lower guidepin 240*b* is received within the recess 244*b* on the second connector block 238, and the recess 244*a* in the first connector block 232 receives the upper guidepin 240*a*, providing precise alignment of the electrical couplings as they are brought into connection. As the carriage continues upwards into its raised position, the springs 242 are compressed, thereby slowing the velocity of the carriage to prevent damage to the components and reduce noise.

In another embodiment of the invention, one of the high or low voltage conductors is fixedly mounted to the pole and coupled and de-coupled by way of a detachable electrical coupling means as described above; and the other of the high or low voltage conductors travels up and down through the pole as the carriage is raised and lowered, as for example over a pulley transport mechanism in the manner shown and described by U.S. Pat. No. 6,447,150 and or International Publication WO 01/75849 A2, both incorporated by reference herein.

Figure 17A:
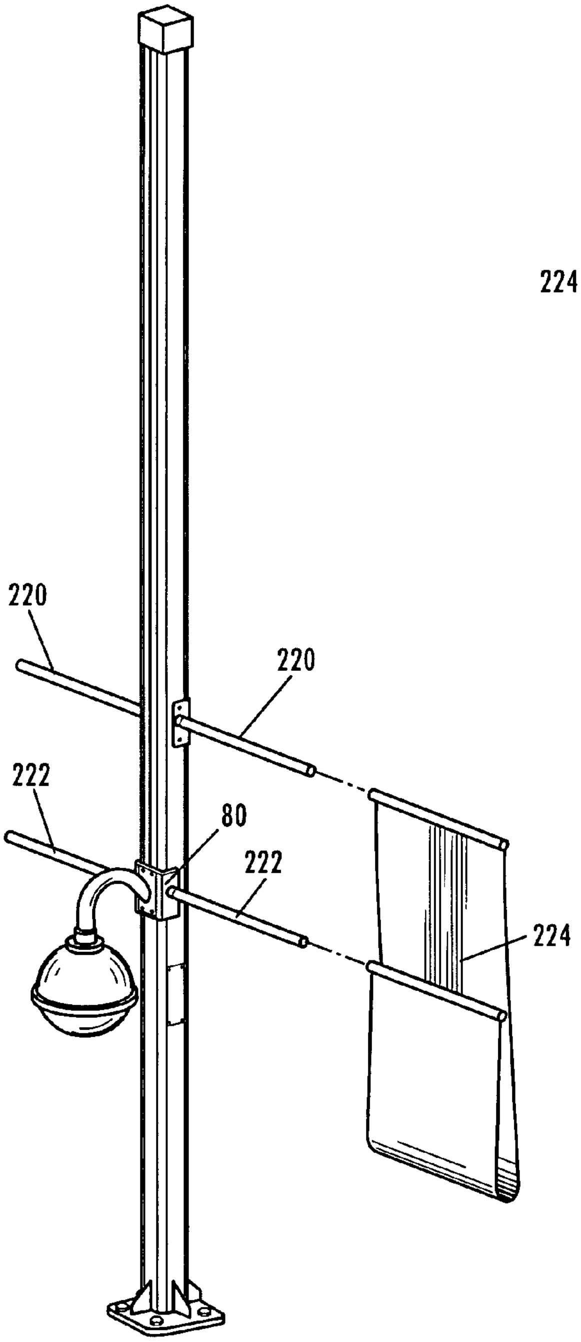
FIGS. 17*a* and 17*b* are perspective views of an alternate embodiment of the pole of the present invention, including banner display elements, shown in lowered and raised positions, respectively.
Figure 17B:
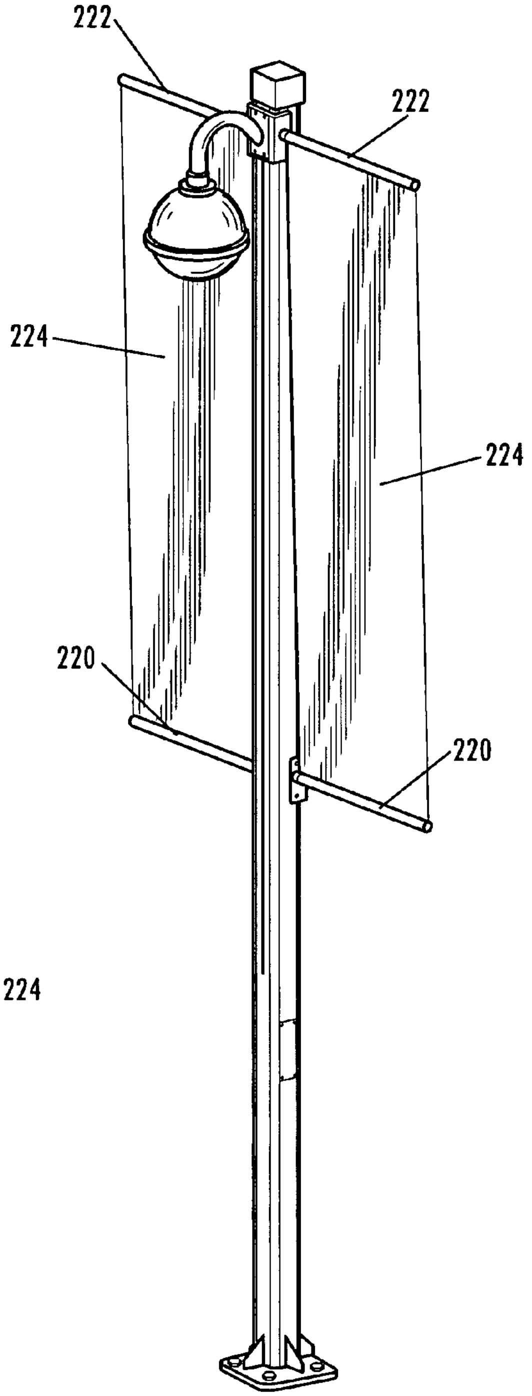

FIGS. 17*a* and 17*b* depict a further embodiment of the pole of the present invention, comprising a banner display system, shown in a lowered and a raised configuration, respectively. One or more lower banner posts 220 are preferably mounted to the pole between the top 32 and the bottom 34. Two lower banner posts 220 are depicted, permitting a pair of banners to be displayed simultaneously. The lower banner posts 220 are optionally detachably mounted to the pole to permit selective positioning depending upon the size of the banner to be displayed. Alternatively, the lower banner posts 220 are permanently mounted in a fixed position on the pole. One or more upper banner posts 222 are preferably mounted to the carriage 70, whereby the upper banner posts are raised and lowered along with the carriage. The mounting bracket 80 is preferably modified to include one or more side flanges for mounting the upper banner post(s) 222. In use, the bottom of a banner 224 is secured to the lower banner posts 220, and the top of the banner is secured to the upper banner posts 222. The carriage 70 and attached upper banner post(s) 222 are lowered to install and remove the banner(s) 224, and raised to display the banner(s).

In operation, one or more supported object such as a surveillance camera, a light, etc., is mounted to the mounting bracket 80 of the carriage 70. The carriage 70 is preferably lowered to the lower position shown in broken lines in FIG.

1 for installation and maintenance of the supported object. The drive mechanism is actuated to rotationally drive the threaded rod 100, thereby moving the carriage 70 upwardly through the channel 36, into the elevated position shown in solid lines in FIG. 1. In the elevated position, the carriage locks 170 engage the carriage guides 76 to prevent vibration of the supported object. As the carriage reaches its elevated position, an electrical connection is automatically made between the supported object(s) mounted to the carriage and one or more fixed conductor(s) extending through the pole, by releasably engaging one or more electrical coupling(s) mounted to the carriage with one or more electrical coupling(s) mounted at the top of the pole and connected to the fixed conductors. The supported object is then used according to standard practice. For example, a supported surveillance camera obtains images from a monitored area surrounding the support pole 10, and sends signals to remote monitoring and/or recording devices. To service the supported object, the drive means is actuated in a reverse direction to lower the carriage 70. As the carriage is lowered, the electrical connection between the supported object(s) mounted to the carriage and the one or more fixed conductor(s) extending through the pole is automatically disconnected by disengagement of the electrical couplings. When servicing is complete, the supported object is raised back into the elevated position as described above.

It will be readily apparent to those of ordinary skill in the art that many additions, modifications and deletions can be made thereto without departing from the spirit and scope of the invention.

What is claimed is:

1. A support pole comprising:

an elongate pole having a first end and a second end, wherein said elongate pole defines a channel extending at least partway between the first and second ends, and further comprising a first electrical coupling mounted at one end of said elongate pole;

at least one electrical conductor fixed to said elongate pole and in electrical connection with the first electrical coupling;

a carriage translationally mounted within the channel of said pole, and comprising a second electrical coupling for releasable engagement with the first electrical coupling; and a drive mechanism to translationally move said carriage along at least a portion of said pole and thereby bring the second electrical coupling into engagement with the first electrical coupling.

2. The support pole of claim 1, wherein said drive mechanism comprises a threaded rod rotationally mounted within the channel of said pole.

3. The support pole of claim 2, further comprising a stabilizer frame slidable within the elongate pale along said threaded rod.

4. The support pole of claim 3, wherein an intermediate coupling element is mounted to said stabilizer frame for engagement between the first and second electrical couplings.

5. The support pole of claim 1, wherein a high-voltage conductor is fixed to a first portion of said pole and a low-voltage conductor is fixed to a second portion of said pole remote from the high-voltage conductor.

6. The support pole of claim 1, further comprising at least one guidepin providing alignment between the first and second electrical couplings as the first and second electrical couplings are brought into engagement.

7. The support pole of claim 1, wherein one end of the elongate pole comprises at least one beveled, inclined carriage lack for engagement with a cooperating beveled, inclined carriage guide portion of said carriage.

8. The support pole of claim 1 further comprising a gasket sealing an opening to said channel.

9. The support pole of claim 1, wherein the first electrical coupling directly engages the second electrical coupling.

10. The support pole of claim 1, wherein the second electrical coupling directly engages the first electrical coupling as the carriage is moved into a raised position by the drive mechanism.

11. A support pole comprising:

an elongate pole having a top and a bottom, and further comprising a first electrical connector block at or near the top of said pole;

a carriage translationally mounted to said elongate pole, and further comprising a second electrical connector block mounted to said carriage; and a stabilizer frame sliding within the elongate pole, and further comprising an intermediate electrical coupling for releasable engagement between the first and second electrical connector blocks.

12. The support pole of claim 11, wherein the first and second electrical connector blocks engage the intermediate coupling as the carriage is moved into a raised position toward the top of the elongate pole, and wherein the first and second electrical connector blocks disengage the intermediate coupling as the carriage is moved into a lowered position toward the bottom of the elongate pole.

13. The support pole of claim 12, further comprising at least one guidepin providing alignment between the first and second electrical connector blocks as the carriage is moved into the raised position.

14. The support pole of claim 11, further comprising at least one electrical conductor fixedly mounted to said pole and in electrical connection with the first connector block.

15. The support pole of claim 14, comprising a first conductor fixed to a first location of said pole for carrying high-voltage electricity, and a second conductor fixed to a second location of said pole for carrying low-voltage electricity, said first and second conductors being isolated from one another.

16. The support pole of claim 11, wherein one end of the elongate pole comprises at least one beveled, inclined carriage lock for engagement with a cooperating beveled, inclined carriage guide portion of said carriage.

17. A support pole comprising:

an elongate pole having a top end and a bottom end, and further comprising a first electrical coupling mounted proximal the top end of said pole;

a carriage translationally mounted to said pole, and further comprising a second electrical coupling for releasable engagement with the first electrical coupling when the carriage is in a raised position proximal the top end of said pole;

at least one guidepin providing alignment between the first and second electrical couplings as the carriage moves into the raised position.

18. The support pole of claim 17, further comprising a threaded rod rotationally mounted within said pole to transport said carriage between the top end and the bottom end of said pole.

19. The support pole of claim 18, further comprising a stabilizer frame sliding within the elongate pole to brace the threaded rod.

20. The support pole of claim 19, wherein the stabilizer frame comprises an intermediate coupling for releasable engagement between the first and second electrical couplings.

21. The support pole of claim 17, further comprising at least one electrical conductor fixedly mounted to said pole and in electrical connection with the first electrical coupling.

22. The support pole of claim 21, comprising a first electrical conductor fixed to a first location of said pole for carrying high-voltage electricity, and a second conductor fixed to a second location of said pole for carrying low-voltage electricity, said first and second conductors being isolated from one another.

23. The support pole of claim 17, wherein the first electrical coupling directly engages the second electrical coupling as the carriage is moved into a raised position toward the top of the elongate pole.

24. The support pole of claim 17, wherein the guidepin provides alignment for direct connection of the second electrical coupling with the first electrical coupling.

25. A support pole comprising:

an elongate pole having a top and a bottom, and further comprising a first electrical connector block at or near the top of said pole;

a carriage translationally mounted to said elongate pole, and further comprising a second electrical connector block mounted to said carriage, whereby the second electrical connector block is directly engageable with the first electrical connector block; and a stabilizer frame sliding within the elongate pole.

26. The support pole of claim 25, wherein the second electrical connector block directly engages the first electrical connector block as the carriage is moved into a raised position toward the top of the elongate pole, and wherein the first and second electrical connector blocks disengage as the carriage is moved into a lowered position toward the bottom of the elongate pole.

27. The support pole of claim 25, further comprising at least one electrical conductor extending through said pole and in electrical connection with the first connector block.

28. The support pole of claim 27, comprising a first conductor fixed within a first location of said pole for carrying high-voltage electricity, and a second conductor fixed within a second location of said pole for carrying low-voltage electricity, said first and second conductors being isolated from one another.

29. The support polo of claim 25, wherein one end of the elongate pole comprises at least one beveled, inclined carriage lock for engagement with a cooperating beveled, inclined carriage guide portion of said carriage.

* * * * *